US012698752B1

(12) United States Patent
Dol et al.

(10) Patent No.: US 12,698,752 B1
(45) Date of Patent: Aug. 4, 2026

(54) BLADELESS WIND TURBINE WITH VORTEX GENERATORS

(71) Applicant: Abu Dhabi University, Abu Dhabi (AE)

(72) Inventors: Sharul Sham Bin Dol, Abu Dhabi (AE); Hasan Tariq Hasan Hamdan, Abu Dhabi (AE); Aghyad Belal Al Tahhan, Abu Dhabi (AE); Abdelrahman Hosny Mohamed El-Said Gomaa, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 0 days.

(21) Appl. No.: 18/593,089

(22) Filed: Mar. 1, 2024

(51) Int. Cl.
*F03D 5/00* (2006.01)
*F03D 9/25* (2016.01)

(52) U.S. Cl.
CPC .............. *F03D 5/005* (2013.01); *F03D 9/25* (2016.05); *F05B 2260/502* (2013.01)

(58) Field of Classification Search
CPC ....... F03D 9/25; F03D 5/005; F05B 2260/502
See application file for complete search history.

(56) References Cited

U.S. PATENT DOCUMENTS

| | | | | |
|---|---|---|---|---|
| 10,641,243 B2 * | 5/2020 | Yañez Villarreal | ...... | H02K 7/09 |
| 2020/0224637 A1 * | 7/2020 | Azadi Yazdi | ............ | F03D 5/06 |

FOREIGN PATENT DOCUMENTS

| | | | |
|---|---|---|---|
| DE | 433513 C | * | 9/1926 |
| KR | 101910526 B1 | * | 1/2019 |

* cited by examiner

*Primary Examiner* — Julio C. Gonzalez

(57) ABSTRACT

A bladeless wind turbine apparatus includes a mast. The bladeless wind turbine apparatus includes protrusions on a surface of the mast. The bladeless wind turbine apparatus includes a base structure. The bladeless wind turbine apparatus includes springs connecting to the base structure. The bladeless wind turbine apparatus includes at least one magnet. The bladeless wind turbine apparatus includes at least one coil magnetic wiring.

13 Claims, 27 Drawing Sheets

200

Flow Velocity Sensor (204)

VBWT Prototype (206)

Wind Tunnel Converging Duct (208)

Motion Mechanism (210)

| Category | Material | Key Properties | Advantages in Bladeless Turbine Application |
|---|---|---|---|
| *Alternative Magnet Materials* | *Ferrite Magnets* | Economical, durable, lower magnetic strength. | Cost-effective for large-scale applications; suitable for low-cost, less demanding environments. |
| | *Samarium Cobalt (SmCo)* | High resistance to demagnetization, excellent high-temperature stability. | Ideal for high-temperature conditions, maintaining performance under varying environmental stresses. |
| | *Alnico Magnets* | High temperature stability, corrosion resistance. | Excellent for outdoor and heated environments, robust against weathering and thermal variations. |
| | *Iron-Gallium Alloy* | Magnetostrictive, converts mechanical vibrations to electricity. | Specifically advantageous for vibrational energy harnessing in bladeless turbines; unique mechanical-to-electrical conversion. |
| | *Composite Magnets* | Flexible, can be shaped or cut, diverse material composition (e.g., rubber magnets). | Versatile for non-standard turbine designs, adaptable to various structural requirements. |

FIG. 14

| Category | Material | Key Properties | Advantages in Bladeless Turbine Application |
|---|---|---|---|
| *Alternatives Magnetic Wiring* | *Aluminum* | Lighter, less expensive than copper, reasonable conductivity. | Beneficial for reducing overall turbine weight, cost-efficient, though with slightly reduced conductivity. |
| | *Silver* | Highest electrical conductivity, but more expensive. | Optimal for high-efficiency, specialized applications where budget is less of a concern. |
| | *Gold* | Excellent corrosion resistance, high reliability, but costly. | Ideal for applications demanding high reliability and longevity, especially in corrosive environments |
| | *Nickel* | Moderate conductivity, good oxidation resistance. | Suitable for environments where corrosion and oxidation resistance are essential, albeit with moderate conductivity. |
| | Carbon Fiber Composite Conductors | Lightweight, reduced sag, excellent tensile strength. | Ideal for applications where weight reduction and durability are crucial, offering a unique alternative to traditional metals. |

FIG. 15

| Category | Material | Key Properties | Advantages in Bladeless Turbine Application |
|---|---|---|---|
| *Alternative Mass Materials* | *Aluminium* | Lightweight, good strength-to-weight ratio, corrosion-resistant. | Reduces overall turbine weight, enhancing frequency response due to lower mass. Resistant to environmental factors. |
| | *Steel* | High strength, good fatigue resistance, widely available. | Offers excellent structural integrity and durability, suitable for larger turbines requiring robust support. |
| | *Carbon Fiber Composite* | Extremely lightweight, high stiffness, low thermal expansion. | Ideal for high-performance applications; enhances vibrational properties due to high stiffness. |
| | *Glass Fiber Reinforced Polymer (GFRP)* | Good strength, lightweight, corrosion resistant. | Suitable for environments with corrosive elements; offers a balance of strength and weight. |
| | *Titanium* | High strength, corrosion-resistant, fatigue-resistant. | Provides exceptional durability and resistance to environmental stress, albeit at a higher cost. |

FIG. 16

| Battery Chemistry | Cost | Specific Power (W/kg) | Specific Energy (Wh/kg) | Efficiency (%) |
|---|---|---|---|---|
| Lithium-ion | High | 150-315 | 75-250 | 95-98 |
| Lead-acid | Low | 75-300 | 30-50 | 70-80 |
| Sodium-Sulphur | High | 150-20 | 150-240 | 80-90 |
| Vanadium Redox | High | 100-166 | 10-35 | 65-85 |
| Nickel Cadmium | Moderate | 150-300 | 70-75 | 70-80 |
| Nickel-Metal Hydride | Moderate | 200-300 | 70-100 | 60-70 |

FIG. 17

| Energy Storage System | Key Features | Advantages | Integration with Microgrids |
|---|---|---|---|
| *Mechanical (e.g., PHES)* | Stores energy as gravitational potential energy. | Highly efficient, especially when renewable energy generation is low. | Difficult to integrate due to scale and infrastructural demands; more suited for larger grid systems. |
| *Electrochemical (Battery Energy Storage)* | High energy density, long cycle life. | Compact, modular, suitable for varied setups; high efficiency and energy density. | Ideal for microgrids; enhances energy independence and reliability; easy to incorporate into existing setups. |
| *Electrical (e.g., Supercapacitors)* | Fast charge/discharge rates, low energy density. | Suitable for quick energy bursts; high power capacity. | Can provide immediate power support in microgrids but limited in long-term energy solutions. |
| *Hybrid Systems* | Combines mechanical and electrochemical systems. | Offers versatility and combined benefits of constituent systems. | Potential for microgrid integration but requires careful planning and significant investment. |

FIG. 18

BLADELESS WIND TURBINE WITH VORTEX GENERATORS

BACKGROUND

Wind turbines are used to harness power from wind and generate electrical power that can then be used for a variety of purposes. Wind turbines generally have gears, rotary equipment, and other features that can result in eventual mechanical wear and tear. Also, wind turbines generate noise when in operation. Presently, there is no wind turbine that lacks gears, rotary equipment, and reduce noise while having a greater operational effectiveness.

BRIEF DESCRIPTION OF DRAWINGS

FIGS. 10A, 10B, 10C, and 10D are diagrams of different perspectives of an example vortex generator;

FIGS. 14, 15, 16, 17, and 18 are diagrams of example tables;

DETAILED DESCRIPTION OF PREFERRED EMBODIMENTS

Figure 1:
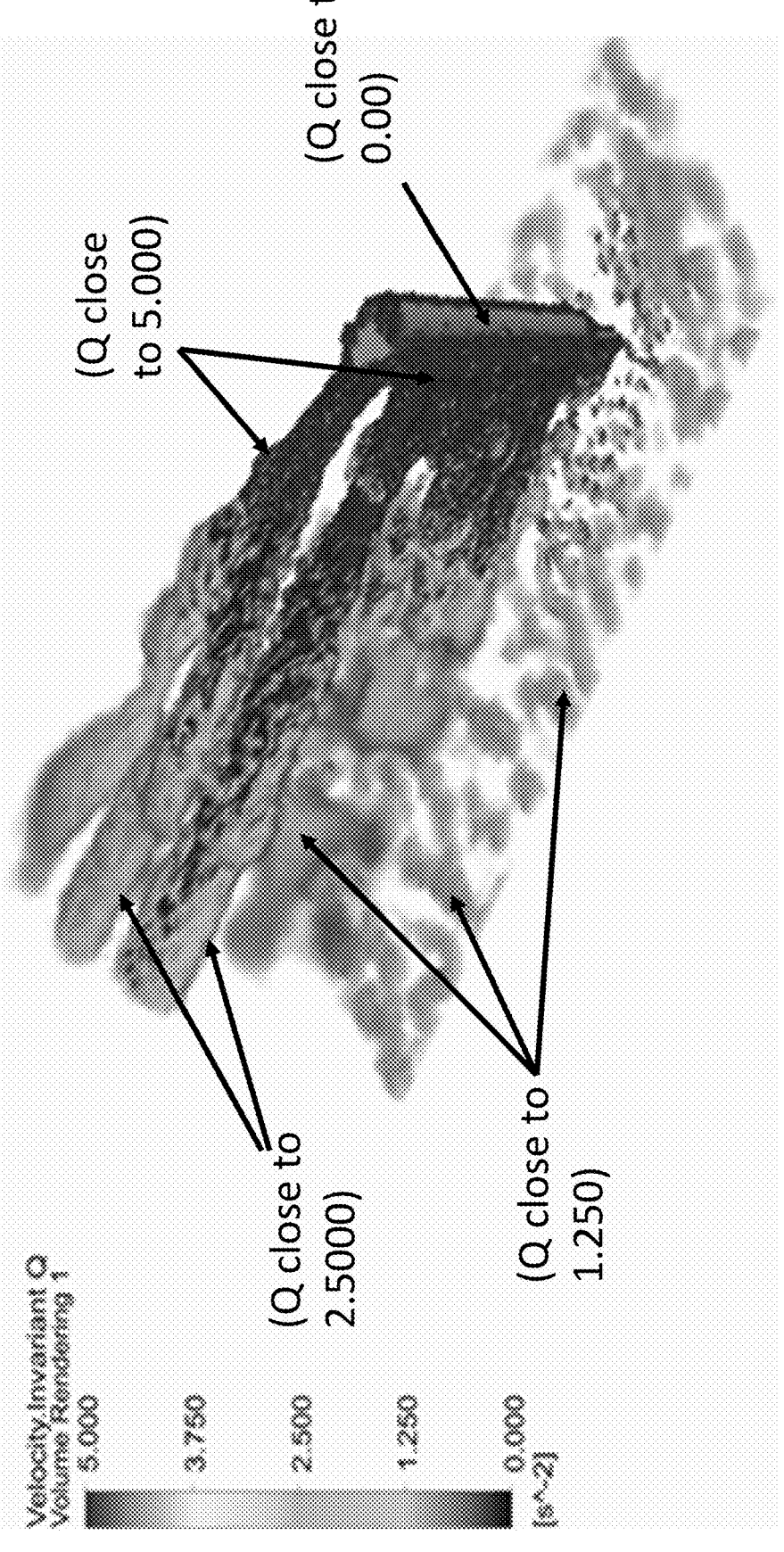
FIG. 1 is a diagram of example graphical imagery describing a vortex shedding region.

The following detailed description refers to the accompanying drawings. The same reference numbers in different drawings may identify the same or similar elements.

Systems, devices, and/or methods described herein are for a bladeless wind turbine system. In embodiments, the bladeless wind turbine system may have one or more features that provide for an alternative energy generation system that is eco-friendly and has a greater operational effectiveness versus other systems. In embodiments, the bladeless wind turbine system may provide for stronger oscillation mechanisms through instability of flow shear layers, reduce mechanical wear, reduce noise due to the lack of any gears or rotary equipment, and the reduce the need for lubricants in comparison to other wind turbine systems. Furthermore, the bladeless wind turbine system described herein are additional benefits that include (a) enhanced energy independence via potential microgrid integration and allowing for localized energy management (and thus reducing reliance on central grid systems); (b) improving reliability and resilience since microgrids can operate independently, ensuring a stable energy supply; (c). integration with microgrids can optimize the renewable energy contribution to the grid; (d) adaptability to existing infrastructure such as storage systems (e.g., lithium-ion Batteries) and can be seamlessly integrated into existing microgrid setups without significant Modifications; (e) improving load balancing and energy efficiency such that microgrids can efficiently manage and distribute the stored energy and enhancing overall grid efficiency and reducing energy waste.

In embodiments, the bladeless wind turbine system may have vortex generator features around the body of the bladeless wind turbine system that allow for harnessing wind energy through bluff-body vortex shedding (e.g., Karman vortices) oscillations. As such, the vortex generator features may promote stronger oscillation mechanisms through instability of the flow shear layers. Accordingly, the bladeless wind turbine system described herein may have multiple benefits over existing systems. For example, the bladeless wind turbine system may have a structure that includes vortex generator structures that are capable of harnessing wind energy through vortex-induced oscillation and controlling the formation of vortex structures. Also, for example, the bladeless wind turbine system may have a base portion that stabilizes the bladeless wind turbine system for more effective anchoring and operational stability.

Furthermore, the bladeless wind turbine system may be constructed of one or more materials (e.g., aluminum) that are used as a sheet material for mast and rod structures, and a powder coating as a protective layer against possible environmental conditions. In embodiments, the vortex generator structures may be constructed of polylactic acid and the base structure may be constructed of steel with a protective coating (e.g., paint) against possible environmental conditions (e.g., snow, rain, etc.). However, the vortex structures and the base structure of the bladeless wind turbine system may be constructed of other materials (e.g., plastic, composite material, fiberglass, carbon fiber, other metals, etc.). In embodiments, the base structure may be constructed of a metal alloy (e.g., such as steel alloy) so that the base structure can support the mast during the oscillations and support the whole system during operation from different conditions (such as environment conditions like wind, and normal operating conditions like the vibrations).

Also, for example, the bladeless wind turbine system may have a spring system that may include a stiffness variable (e.g., 925 Newtons/meter) that can be used to assist in energy conversion and assist in the oscillatory motion of the bladeless wind turbine system described herein.

In embodiments, the bladeless wind turbine system also has features that include a oscillation mechanism and also energy harvesting. In embodiments, the bladeless wind turbine system may provide for vortex-induced vibrations (VIV) for energy conversion. In embodiments, vortex generators can produce stronger vortex formations and fluctuations, and thus, can be applied in lower wind speed application (i.e. wind speed lower than 5 m/s). In embodiments, the vortex that is created can increase the amount of oscillation (e.g., VIV) of the bladeless wind turbine system. In embodiments, the bladeless wind turbine system may have a cylindrical type design with the top face of the cylinder portion having a wider circumference than the bottom of the face of the cylinder portion. In embodiments, the amount of oscillation results in alternating current (AC) produced via a magnetic induction system and copper coils. In embodiments, the generated AC is then sent to a power system which generates power.

In embodiments, spring features of the bladeless wind turbine allow for the vortex shedding frequency to be equivalent to the frequency of the structure of the bladeless wind turbine. Accordingly, this amplifies the generated frequency and hence also increases the potential power. Furthermore, the top-heavy design of the cylinder structure of the bladeless wind system is a more aerodynamic body and improves the amount of possible power generation by the system.

In embodiments, wind interaction with the bladeless wind turbine system (in particular, interactions with the vortex generator structures) induces a pattern of vortices, causing oscillation in the mast structure (e.g., the top-heavy cylinder structure) of the bladeless wind turbine system. Thus, for example, the vortex generators may generate oscillations that increase with wind speeds. In embodiments, a Strouhal number, St (which is a dimensionless number that relates the vortex shedding frequency to the wind speed and body diameter) may be 0.21 for a wide range of wind conditions and for cylindrical bodies. In embodiments, the oscillations may then be transferred via a magnetic induction system into alternating current (AC) that is then used to generate power (which is then stored or directly used) via a power system, such as power system 2100. In embodiments, maximum energy harvesting (e.g., generation of power from the wind) may occur within a 'lock-in' region, which is when the bladeless wind turbine system's natural frequency aligns with the vortex shedding frequency (i.e., the resonance). In embodiments, the "lock-in" region is a critical operational state in bladeless wind turbines where the natural frequency of the turbine structure aligns with the wind-induced vortex shedding frequency. This alignment leads to resonance, amplifying the turbine's oscillations and thereby maximizing energy harvesting efficiency.

In embodiments, the bladeless wind turbine system may provide for a mechanism to control the oscillations through vortex shedding frequency that can be calculated through Strouhal number (St):

$$St = \frac{f_s D}{U}$$

where $f_s$, D, and U are the shedding frequency, the body diameter, and the inlet velocity, respectively. The natural frequency can be calculated by the following equation:

$$f_n = \frac{1}{2\pi} * \sqrt{\frac{k}{m}}$$

where m is the mass of the mast whilst k is the spring stiffness constant. Total power generated from a single VBWT can be determined from the following:

$$P(t) = v(t) F_L \sin(2\pi f_n t)$$

where $F_L$ is the lift force, v (t) is the oscillation velocity, and t is the oscillation time. The non-constant cross-sectional shape (e.g., based on the different size of the top and bottoms of the mast section) of this bladeless wind turbine system allows the increasingly shear layers instabilities and maximum wind speed at the mast tip for larger oscillations.

Figure 2:
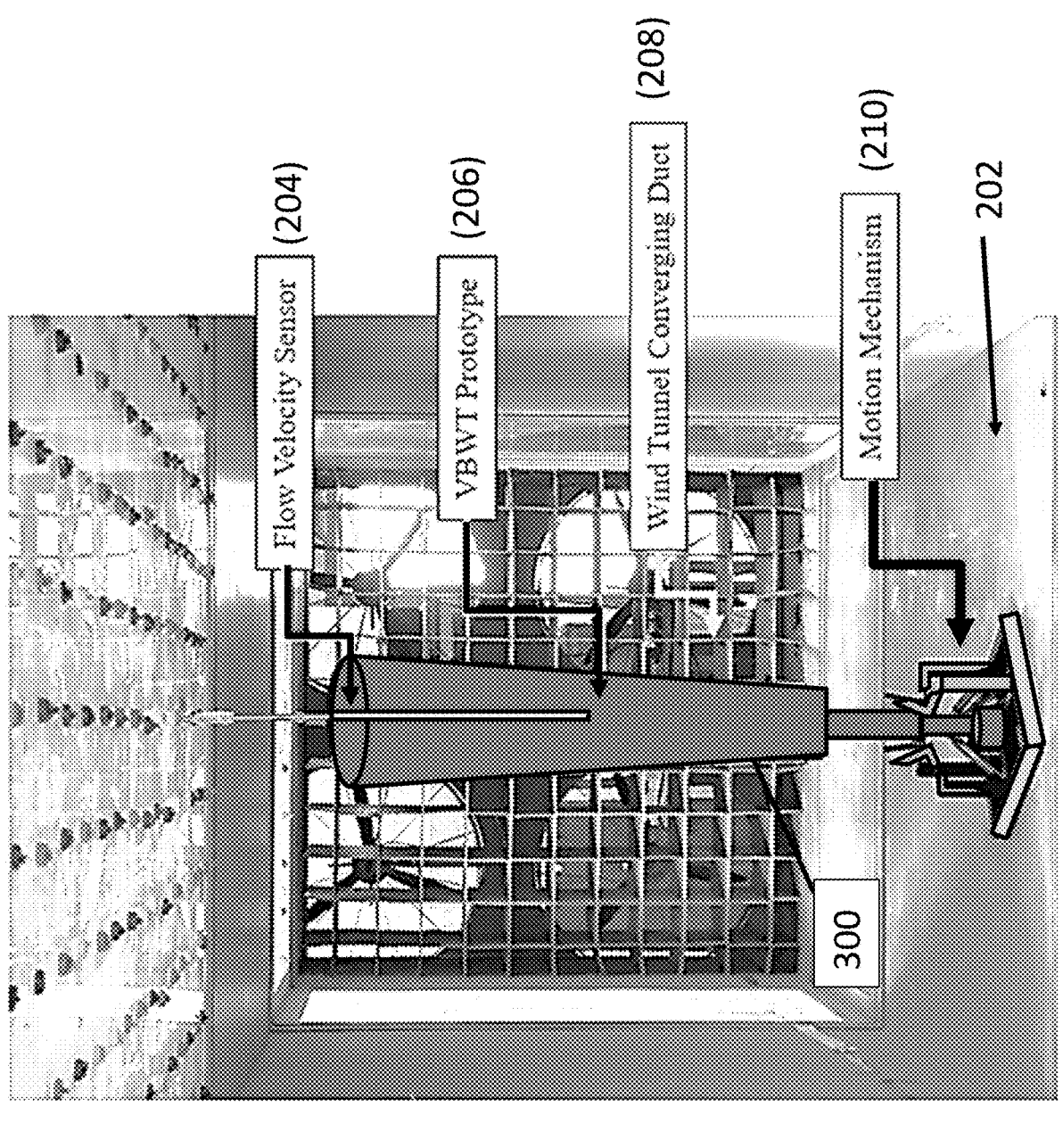
FIG. 2 is a diagram of an example bladeless wind turbine.

In embodiments, a simulation model, using a two-way Fluid-Structure Interaction (FSI) simulation may be used to determine performance. FIG. 1 is an example output of a simulation where vortices are shown. In addition, the bladeless wind turbine system may be wind tunnel tested to confirm the simulation accuracy of the graphical output shown in FIG. 1. FIG. 2 is an example diagram showing testing of a bladeless wind turbine system (e.g., bladeless wind turbine system 300). As shown in FIG. 2, in environment 200, bladeless wind turbine system 300 is located within a wind tunnel 202. Attached to bladeless wind turbine system 300, are flow velocity sensor 204, VBWT 206, and motion mechanism 210. Also shown in FIG. 2, wind tunnel converging duct 208 is shown. In environment 200 may be used to test the features of bladeless wind turbine 300.

Figure 3:
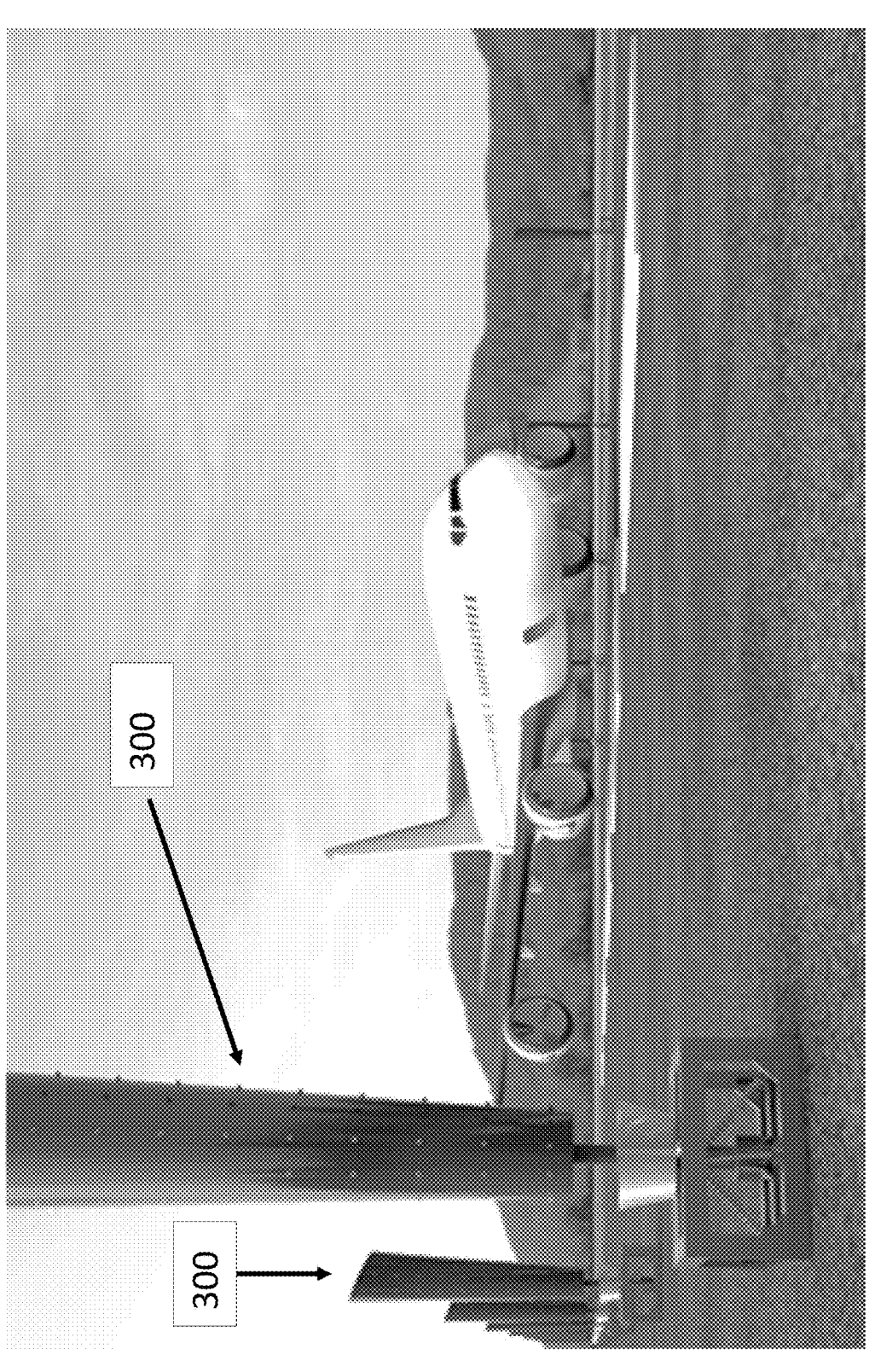
FIG. 3 is a diagram of an example environment in which systems and/or methods described herein may be implemented.

FIG. 3 is an example diagram showing a use application of bladeless wind turbine system 300. As shown in FIG. 3, multiple bladeless wind turbine systems 300 are placed on the perimeter of a runway. As shown in FIG. 3, an airplane is shown on a runway and may be either landing or preparing to take off. In either situation, the airplane will create winds that can be used by bladeless wind turbine systems 300 to oscillate. As each bladeless wind turbine system 300 oscillates, the movement is converted into energy (as described above).

Figure 4:
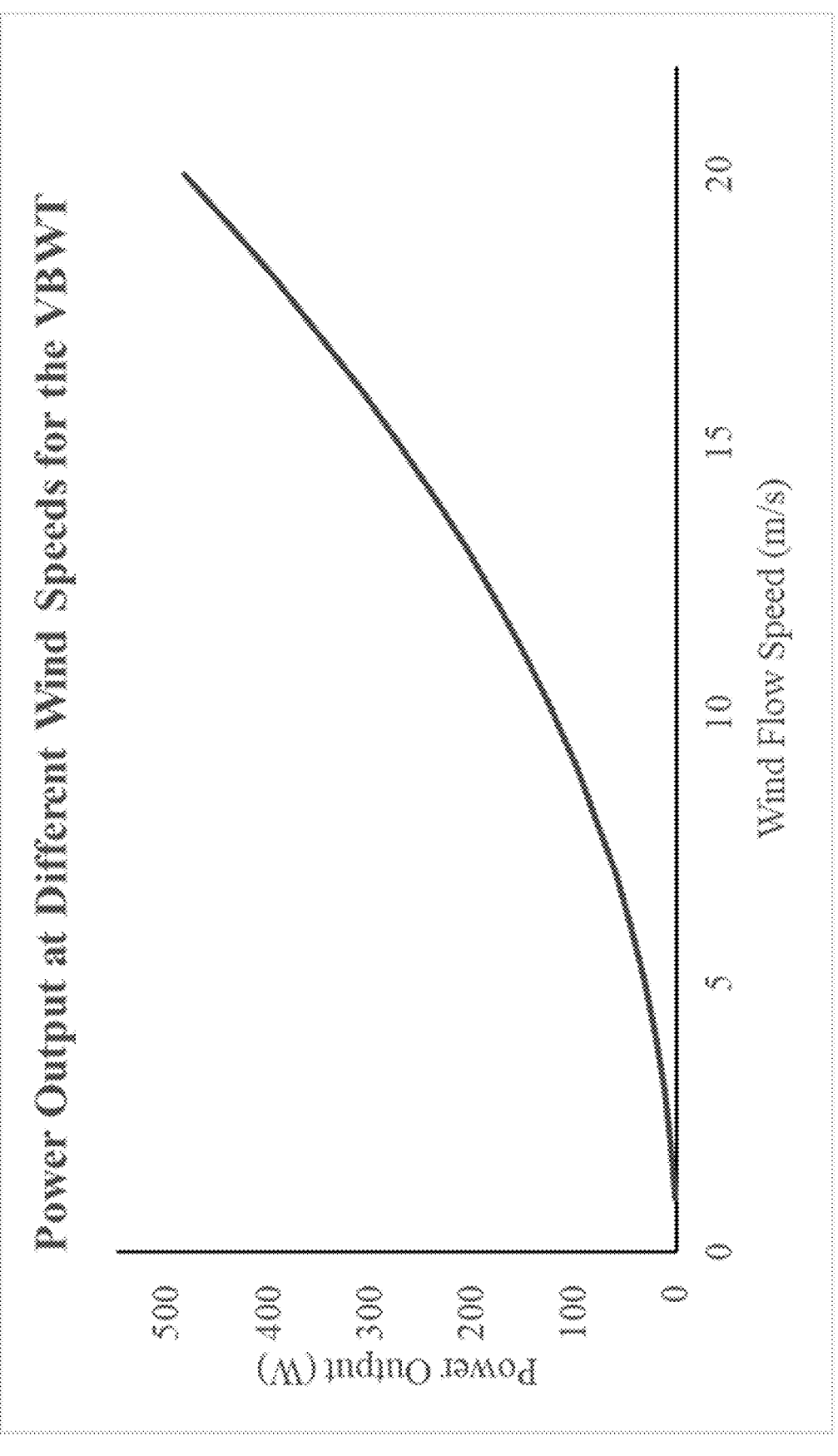
FIG. 4 is a diagram of an example graph.

In embodiments, the bladeless wind turbine system may generate power. In embodiments, the bladeless wind turbine system relies on an oscillating magnet and copper coils, utilizing the principles of electromagnetic induction. In embodiments, as the mast vibrates, the magnet's movement relative to the coils generates electrical power, offering a bladeless alternative to conventional wind energy generation. For example, the bladeless wind turbine system is capable of generating 1.423 kWh of energy per day based on the averaged wind speed of 7 m/s (i.e. at the Arabian Gulf Region). FIG. 4 is an example graph that describes the power output of the bladeless wind turbine system at different wind speeds. In embodiments, power generated from the bladeless wind turbine system may be sent to a battery for storage. In embodiments, the battery system may be part of the bladeless wind turbine system or may be a separate system. In embodiments, the bladeless wind turbine system have a computing device which can obtain data about how much the bladeless wind turbine system oscillates, how much power is generated, and other electronic information via sensors attached onto the bladeless wind turbine system.

In embodiments, the features of the bladeless wind turbine system as described herein provide for significant market impact due to lower operational costs and minimal environmental footprint. Furthermore, the bladeless wind turbine system provides an alternative to traditional turbines in noise-sensitive areas and regions where space constraints (e.g., for an apparatus footprint) may be an issue.

Figure 5:
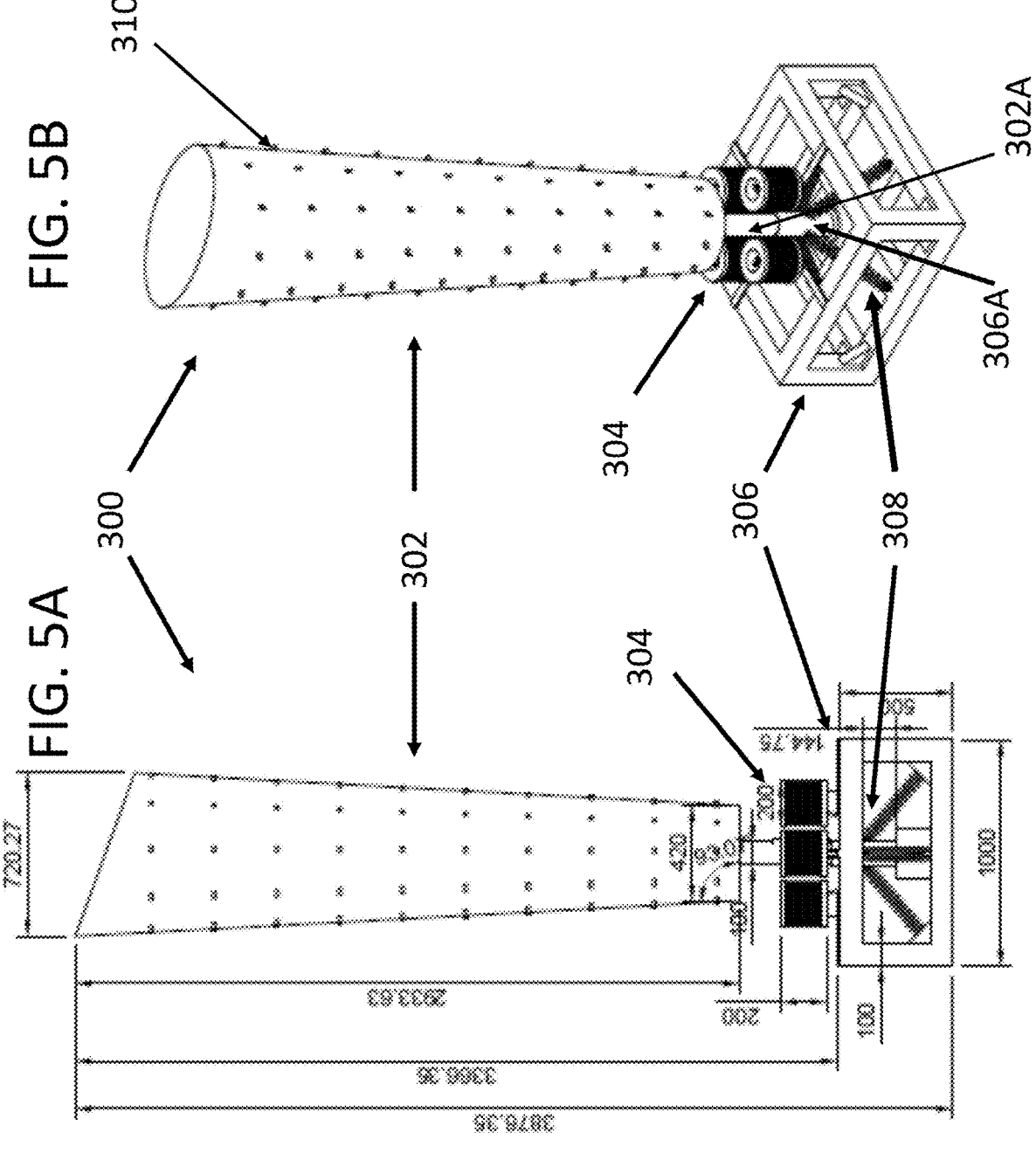
FIGS. 5A and 5B are diagrams of different perspectives of an example bladeless wind turbine.

FIGS. 5A and 5B are diagrams of an example bladeless wind turbine system 300. FIG. 5A shows a side (or even considered front) perspective view of bladeless wind turbine system 300 while FIG. 5B shows an overview perspective view of bladeless wind turbine system 300. As shown in FIGS. 5A and 5B, bladeless wind turbine system 300 has mast structure 302. In embodiments, mast structure 302 is a cylindrical-type shaped structure but with a top face surface having a greater circumference than a bottom face surface (which is facing down to base structure 306). FIG. 5B further shows connector 302A which is connected at one end to the bottom face of mast structure 302, and is connected at the other end to spherical support structure 306A (which is part of base structure 306). Around connector 302A and spherical support structure 306A, magnetic induction system 304 is shown. In embodiments, magnetic induction system 304 may be constructed with copper coil packs. While FIG. 5B shows four parts of magnetic induction system 304, magnetic induction system 304 may have fewer or greater copper coil packs. FIGS. 5A and 5B also show spring powered motion mechanisms 308. As shown in FIGS. 5A and 5B, each spring powered motion mechanism 308 is connected at one end to a lower portion of base structure 306 and the other end is connected to spherical support structure 306A.

FIGS. 5A and 5B also show base structure 306. In embodiments, base structure 306 is a rectangular or square-shaped structure. As shown in FIGS. 5A and 5B, each side/face of base structure 306 has an open area (e.g., a slit, opening, etc.). In embodiments, the opening in the base-structure is made for accessibility to the inside components, which can be used to make it easily serviceable in case of any issue. Furthermore, this design is structurally sound to support the mast and other features of the bladeless wind turbine system. In alternate embodiments, each open area may be covered with a material (e.g., metal, plexiglass, plastic, etc.). FIGS. 5A and 5B also show vortex generators 310 that are distributed across the surface of mast structure 302. In embodiments, each vortex generator 310 may be at a particular distance from another vortex generator 310.

Figure 6:
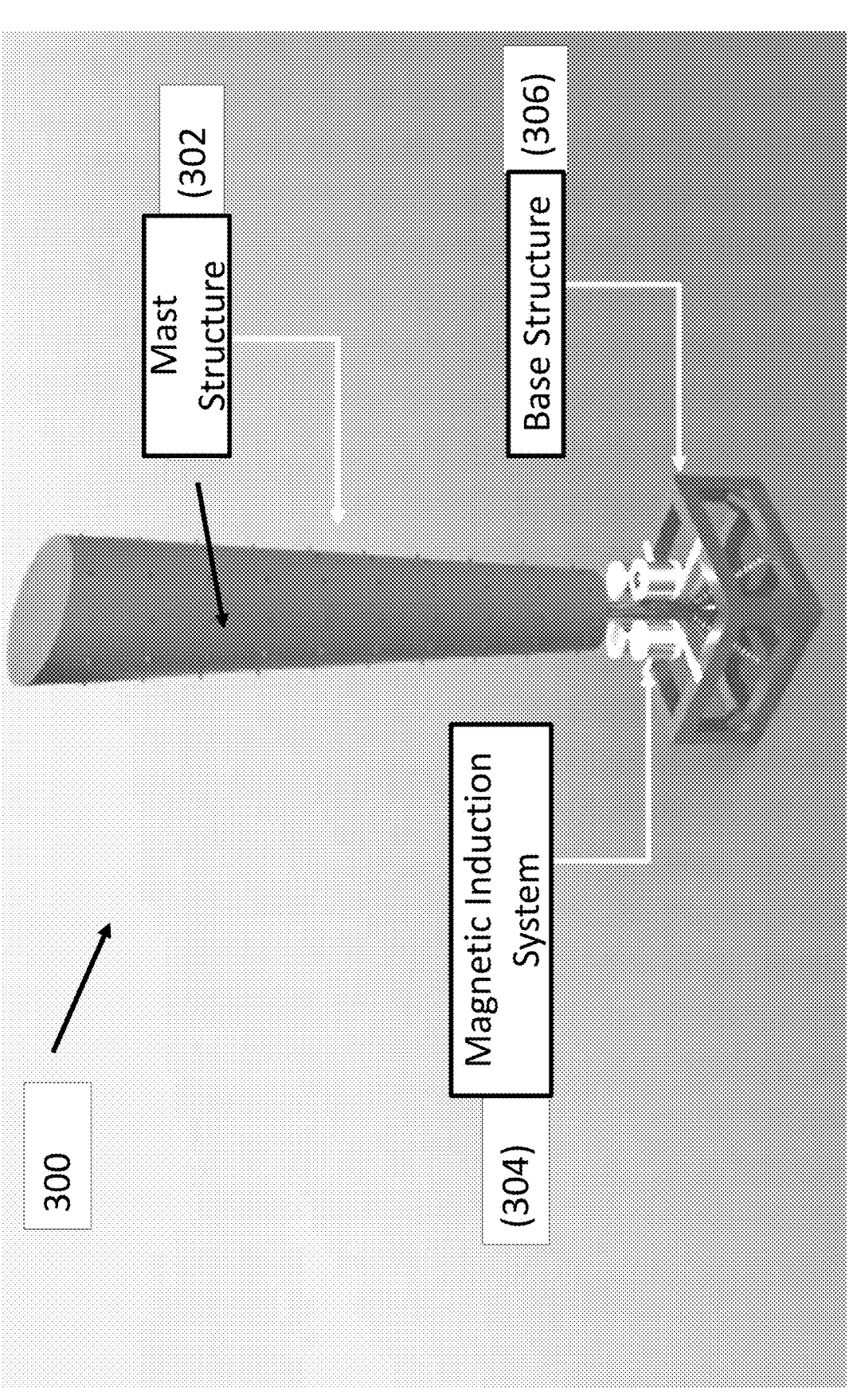
FIG. 6 is a diagram of an example bladeless wind turbine.
Figure 7:
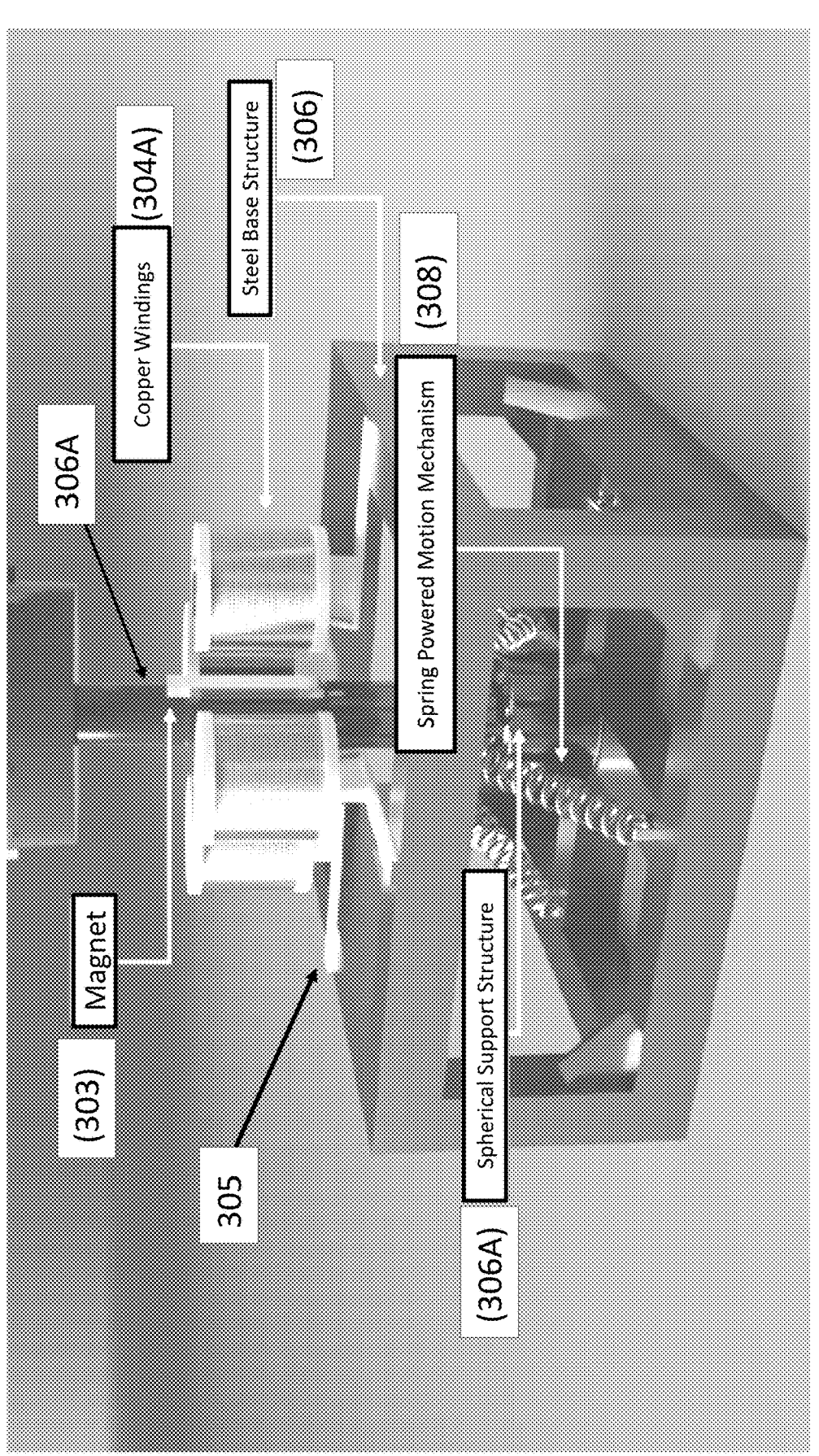
FIGS. 7, 8, and 9 are diagrams of portions of an example bladeless wind turbine.

FIG. 6 is an example three-dimensional diagram of blade-less wind turbine system 300. FIG. 6 shows similar features as that shown in FIGS. 5A and 5B. FIG. 7 is an example three-dimensional diagram describing a portion of bladeless wind turbine system 300. As shown in FIG. 7, bladeless wind turbine system 300 has magnet 303 attached to spheri-cal support structure 306A. Also shown in FIG. 7, magnetic induction system 304 is shown with copper windings 304A. Each copper winding 304A feature has a connector 305 that is connected to (a) the bottom of each part of magnetic induction system 305, and (b) the top surface of base structure 306. Also shown in FIG. 7, spherical support structure 306A is shown which is where each spring pow-ered motion mechanism 308 is attached to (as well as being attached to base structure 306).

Figure 8:
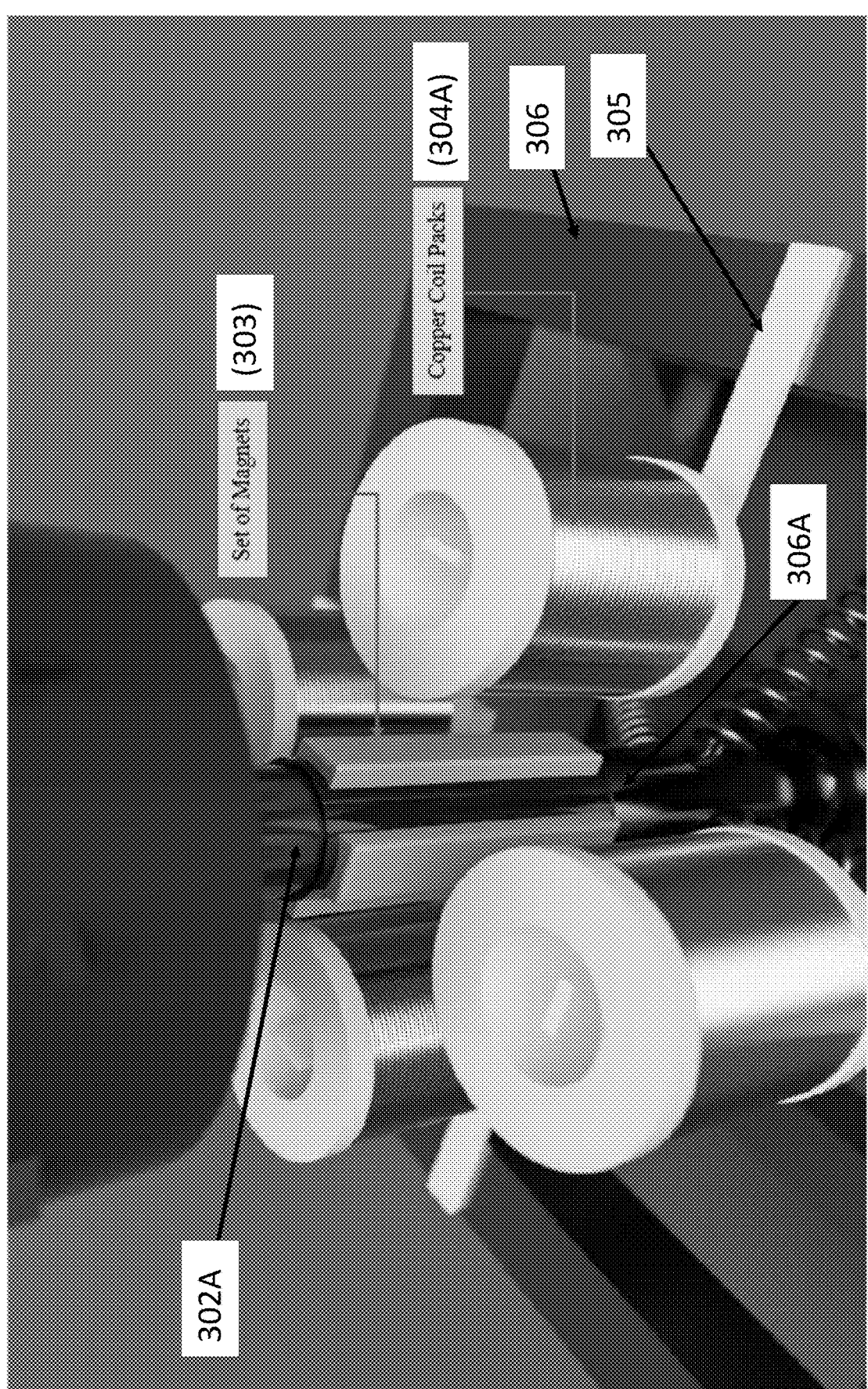

FIG. 8 is an example three-dimensional diagram describing a portion of bladeless wind turbine system 300. As shown in FIG. 8, connector 302A is shown as connected to spherical support structure 306A. Also shown in FIG. 8, magnets 303 are attached to spherical support structure 306A. Copper coils 304A are shown and are part of mag-netic induction system 304. As shown each copper coil 304A has connector 305 attached to its bottom surface. As shown in FIG. 8, the other end of connector 305 is attached to base structure 306.

Figure 9:
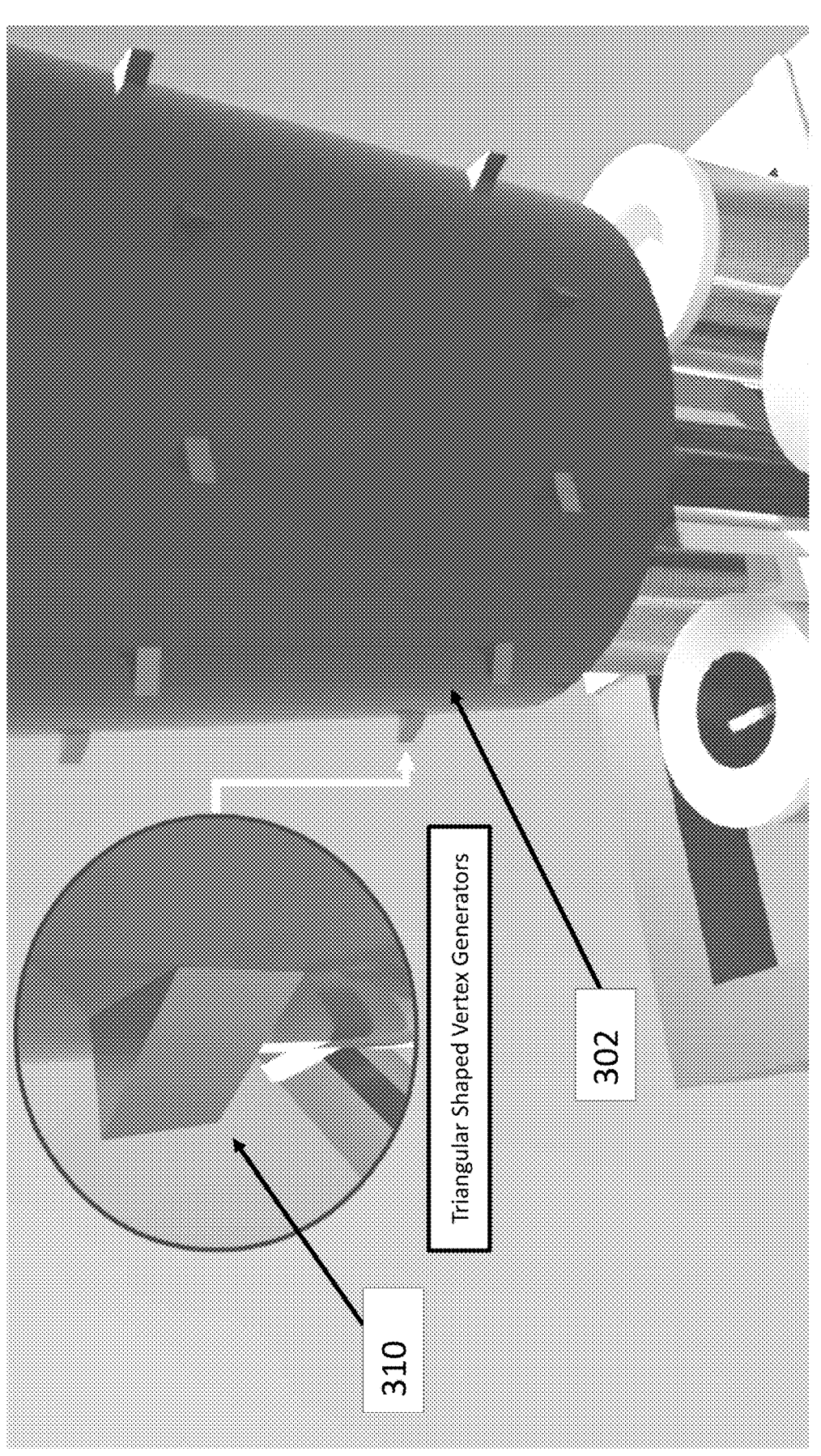

FIG. 9 is an example three-dimensional diagram describing a portion of bladeless wind turbine system 300. As shown in FIG. 9, the surface of mast structure 302 has multiple vortex generators 310. As shown in FIG. 9, each vortex generator 310 is shown with a triangular shape. However, in other embodiments, vortex generators 310 may be have a different shape or may be made of vortex gen-erators 310 of one shape and vortex generators 310 of another shape. In embodiments, if each vortex generator 310 is triangular shaped, the direction of each vortex generator 310 may be different. For example, one vortex generator 310 may have its top edge parallel to the surface of mast structure 302 while another vortex generator 310 may have its top edge perpendicular to the surface of mast structure 302.

Figures 10A, 10B, 10C, 10D:
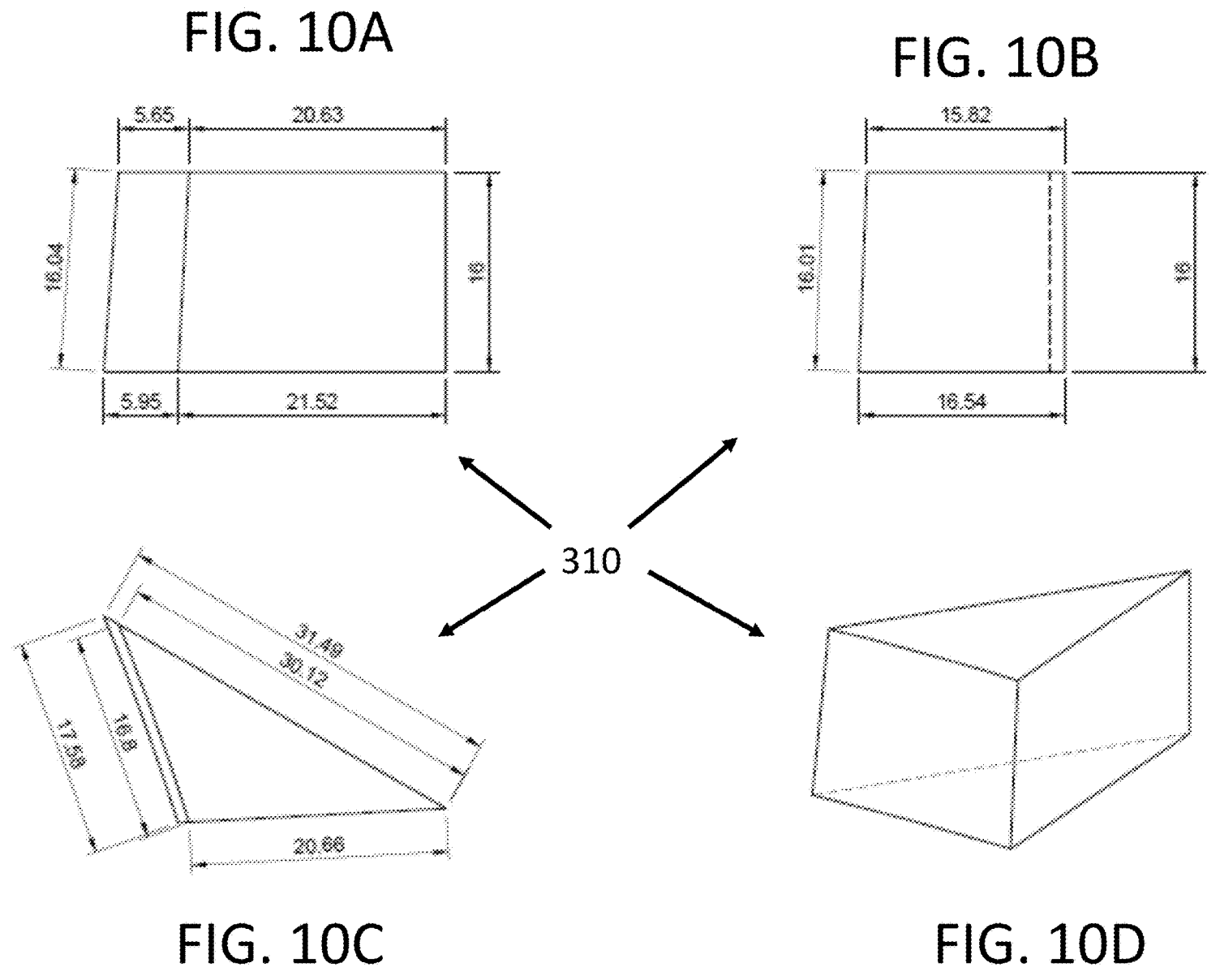

FIGS. 10A-10D describe different perspectives of vortex generator 310. As shown in FIGS. 10A-10C, each unique side of vortex generator 310 is shown. FIG. 10D shows an overall, three-dimensional view of vortex generator 310 which in this example is prism shaped. FIG. 10A shows one side of vortex generator 310, FIG. 10B shows a second side of vortex generator 310, and FIG. 10C shows a third side of vortex generator 310. In embodiments, the side shown in either FIG. 10A, 10B, or 10C can be the side that attaches to a surface of mast structure 302. For example, the side shown in FIG. 10A may be the side that attaches to mast structure 302. In some embodiments, different sides of different vortex generators 310 may be used to attach mast structure 302. For example, one vortex generator 310 may be attached to mast structure 302 via the side shown in FIG. 10A; and, another vortex generator 310 may be attached to mast structure 302 via the side shown in FIG. 10B. Thus, the distance of the outer edge of one vortex generator 310 (attached to mast structure 302) may different than the distance of the outer edge of another vortex generator 310 (attached to mast structure 302).

Figure 11A:
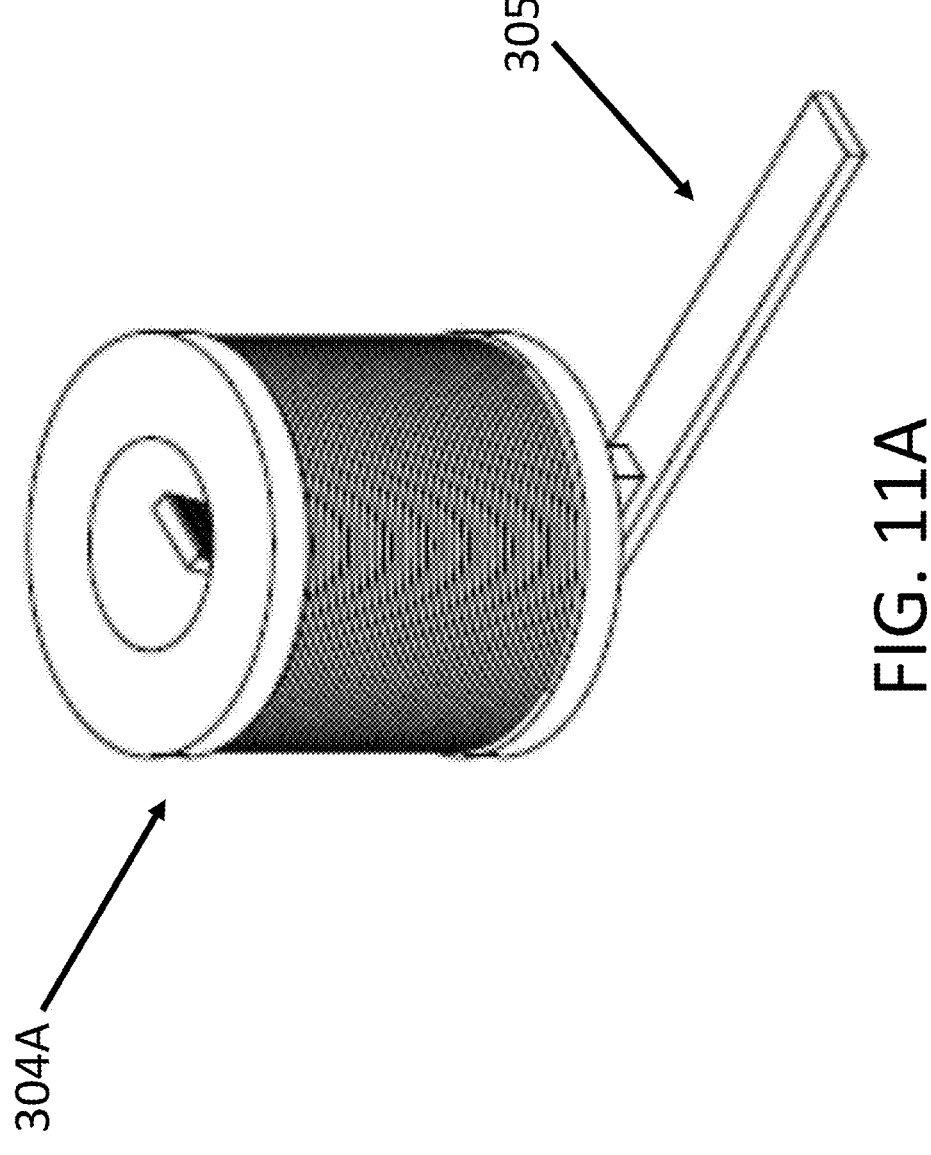
FIGS. 11A, 11B, 11C, and 11D are diagrams of different perspectives of an example power generation system.

FIGS. 11A-11D describe different perspective views of portions of magnetic induction system 304. FIG. 11A shows a three-dimensional overall perspective view of a copper coil (e.g., copper coil 304A). In embodiments, there may be multiple copper coils 304A that make up magnetic induction system 304. In embodiments, copper coil 304A may be attached to base structure 306 via connector 305. In embodi-ments, as connector 305 is L-shaped (with the angle between the horizontal and vertical portions being 90 degrees or less), connector 305 may be attached to an interior surface (which is an area that is not covered in copper coils) of the center hole of the casing of copper coil 304A and the other end of connector 305 may be attached to base structure 306. In embodiments, the casing of copper coil 304A may be constructed of metal, plastic, or any other material. In embodiments, connector 305 may be constructed of metal, plastic, or any other material.

Figures 11B, 11C:
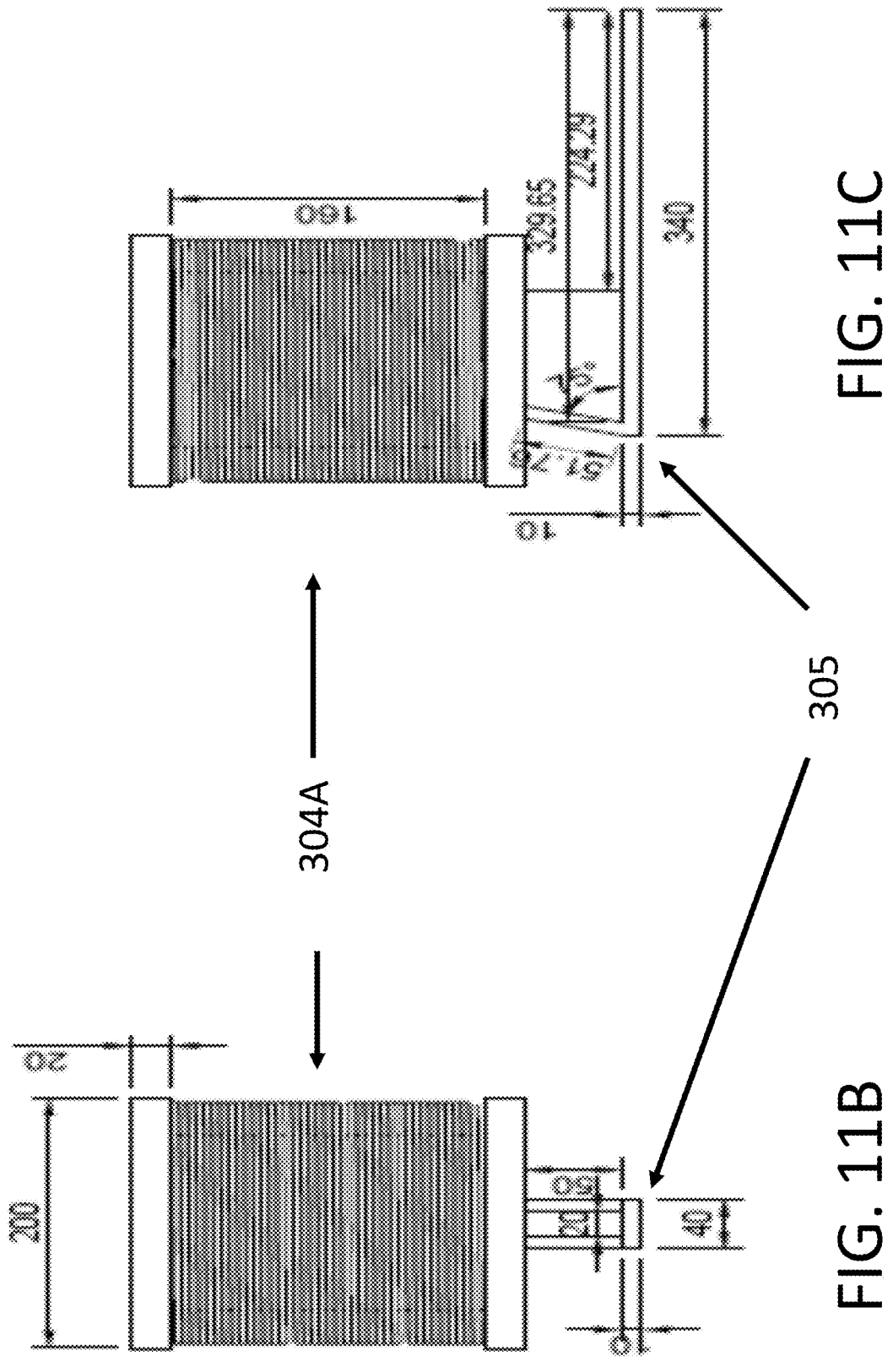
Figure 11D:
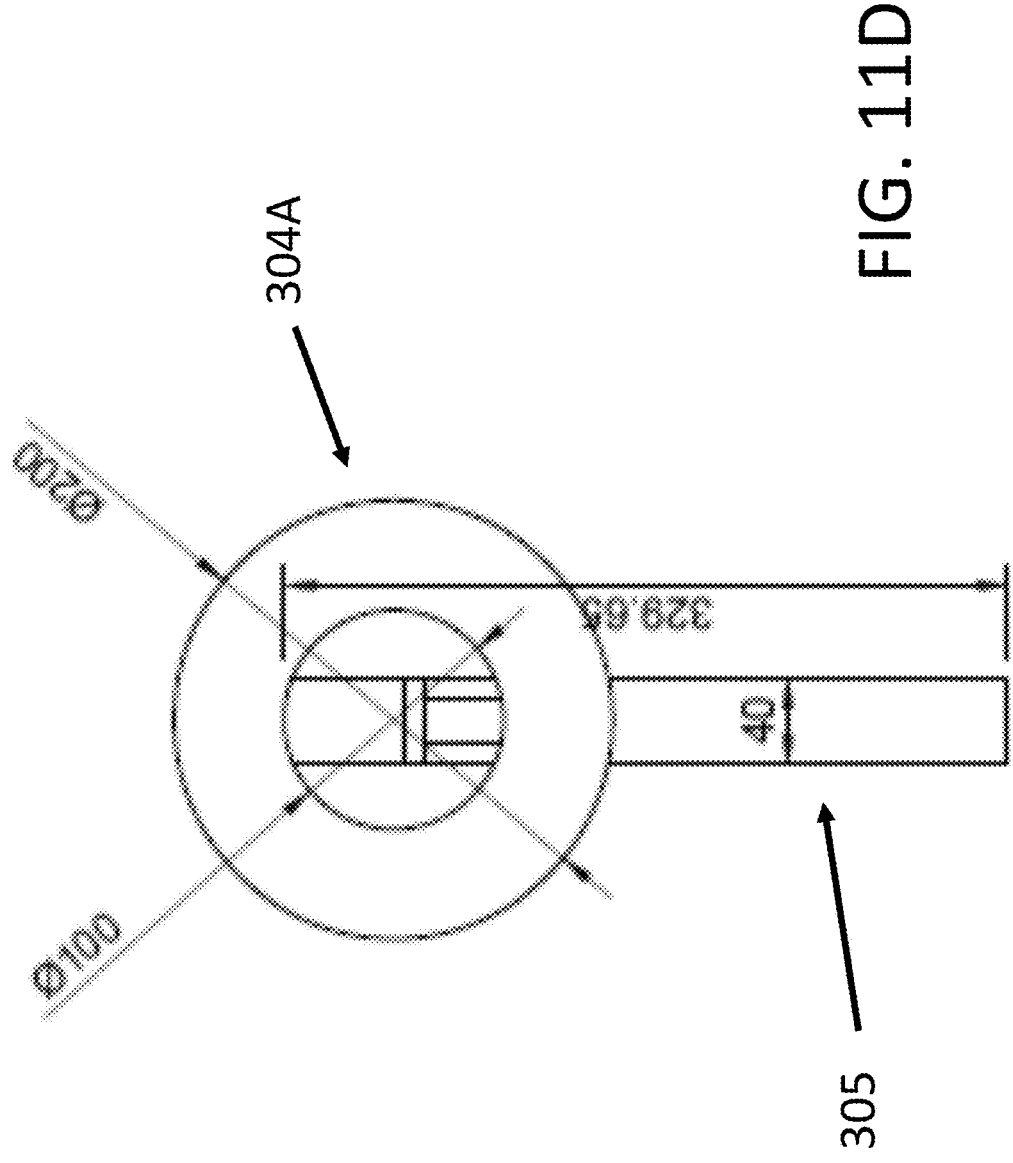

FIG. 11B shows a front (or back) perspective view of copper coil 304A. FIG. 11C shows a side perspective view of copper coil 304A. FIG. 11D shows a top perspective view of copper coil 304A. FIGS. 11A-11D also show example measurements of particular features of copper coil 304A and connector 305; however, other sizes, distances may be used for the particular features of copper coil 304A as described in FIGS. 11A-11D. In embodiments, the oscillations gener-ated by bladeless wind turbine system 300 generate alter-nating current (AC) via the magnet induction system 304 and copper coil 304A that is then used to generate power (as further described in FIG. 21).

Figures 12A, 12B:
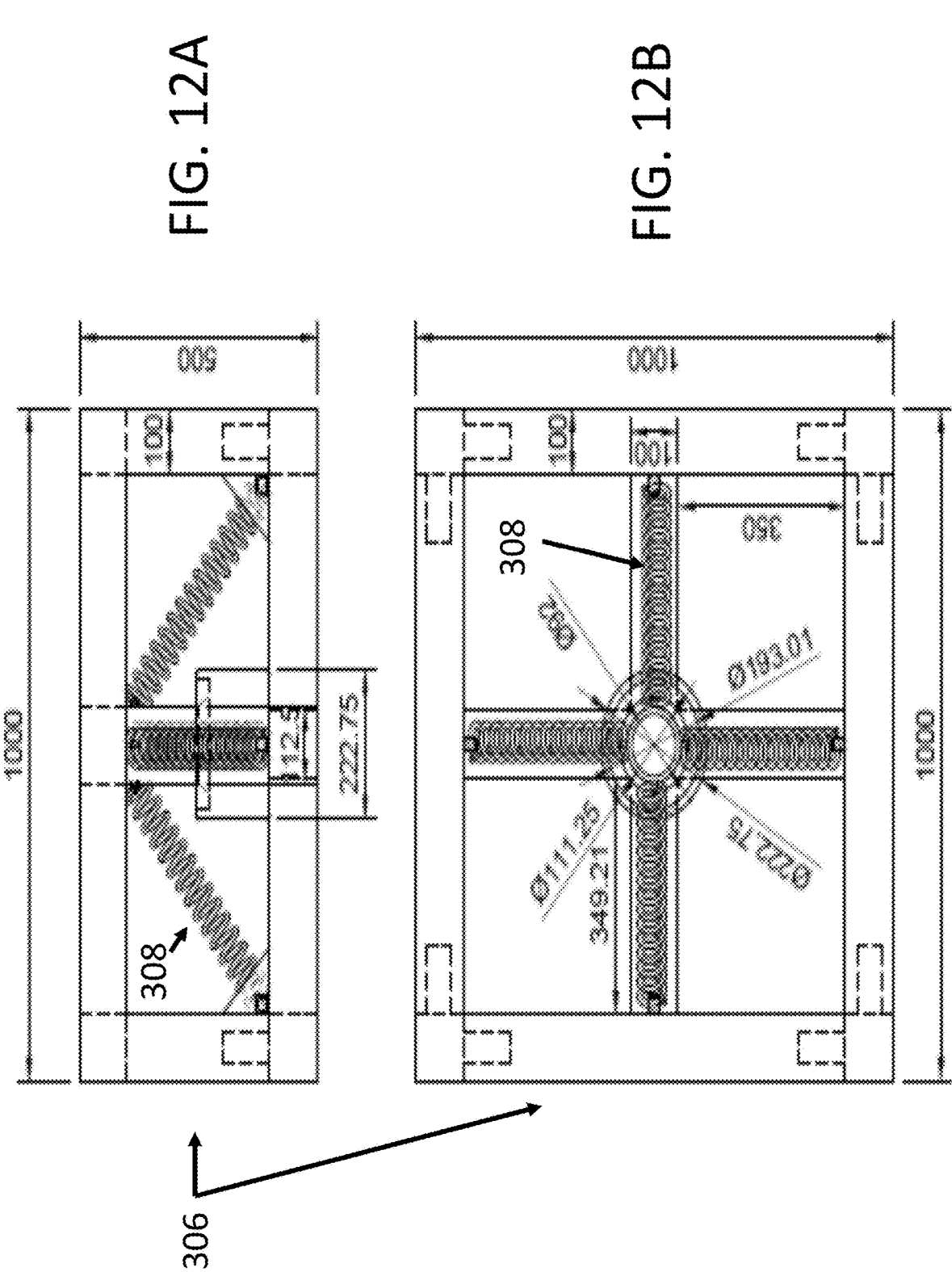
FIGS. 12A, 12B, and 12C are diagrams of different perspectives of an example base structure.
Figure 12C:
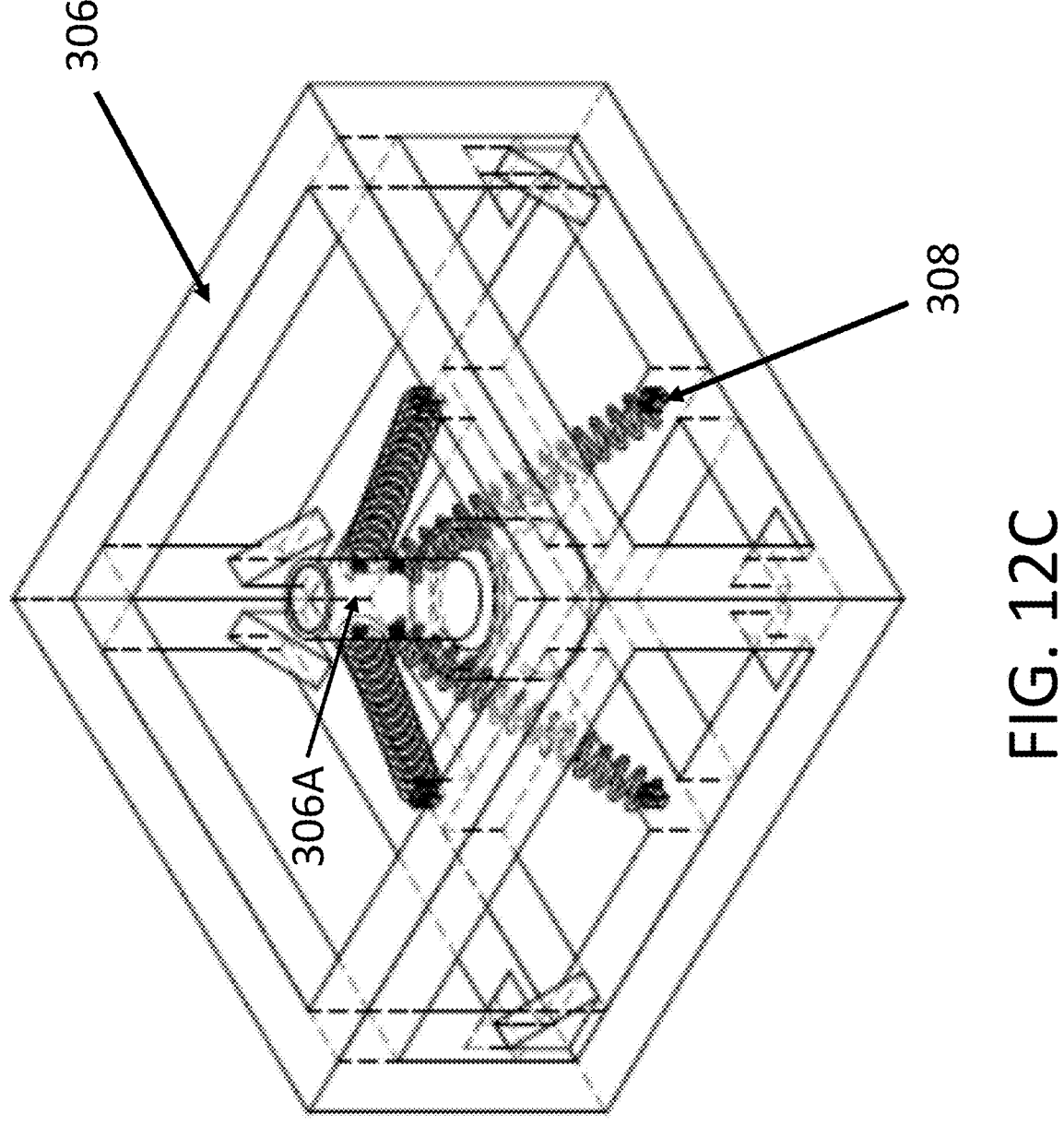

FIGS. 12A-12C describe different perspective views of base structure 306 and spring powered motion mechanisms 308. FIG. 12A shows a side perspective view of base structure 306 without mast structure 302, magnetic induc-tion system 304, or magnets 303. As shown in FIG. 12A, three of the four spring powered motion mechanisms 308 are visible in the side perspective view of base structure 306. In embodiments, each spring powered motion mechanism 308 may be connected to a center of a bottom section of base structure 306. As shown in FIG. 12A (as well 12B and 12C), base structure 306 has four sections that are connected to each other with a tongue and groove connection. In alternate embodiments, the bottom (and/or top) of base structure 306 may be manufactured (e.g., via extrusion, die cast, three-dimensional printing) as a single structure.

As shown in FIGS. 12A-12C, the other end of each spring powered motion mechanism 308 is attached to spherical support structure 306A. In embodiments, each spring powered motion mechanism 308 may be attached to base structure 306 via a nail, pin, glue, weld, or other process/device for attachment. Similarly, each spring powered motion mechanism 308 may be attached to spherical support structure 306A via a nail, pin, glue, weld, or other process/device for attachment.

Figure 13:
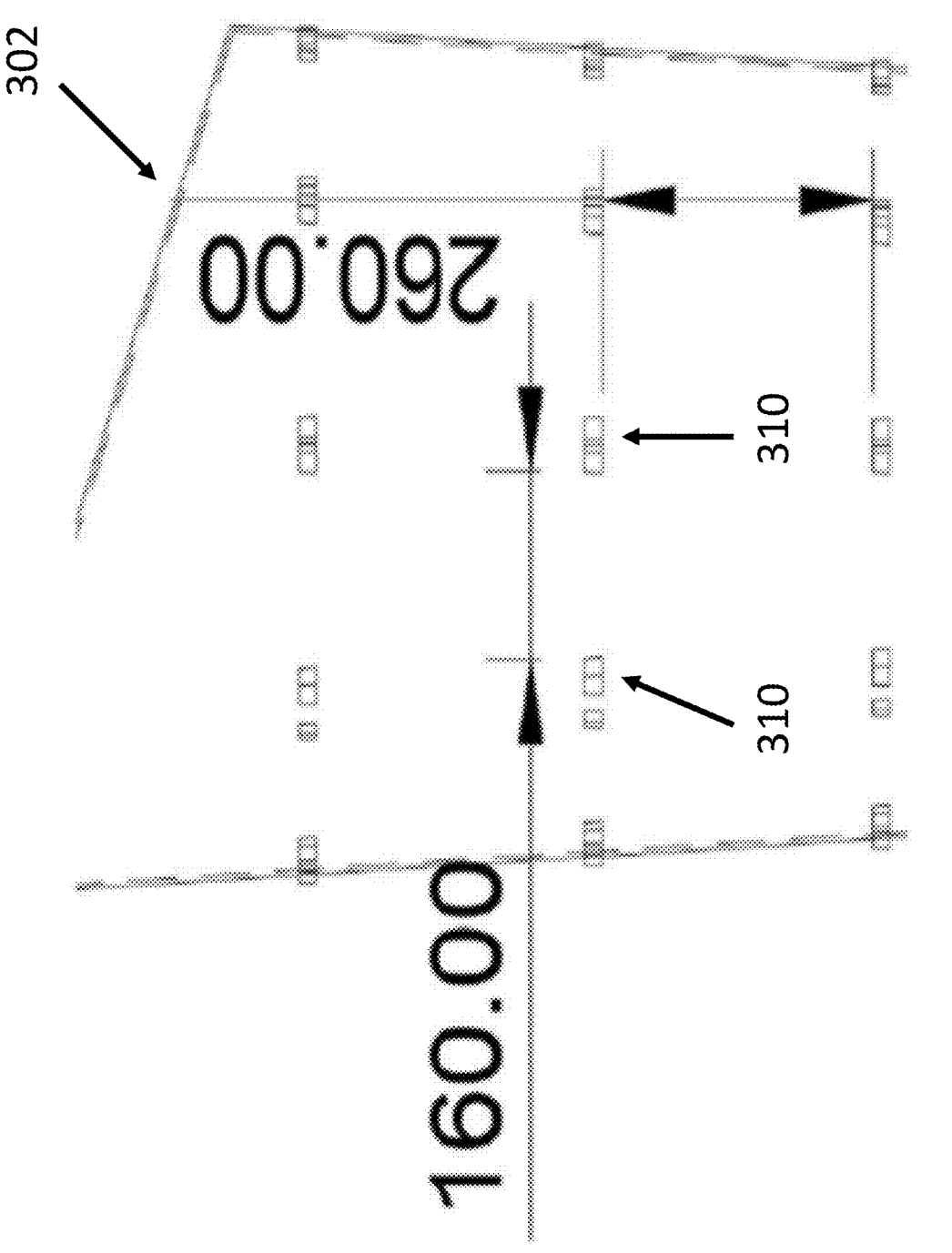
FIG. 13 is a schematic diagram of example vortex generator locations.

FIG. 13 is an example diagram showing distances between vortex generators 310 that are mounted onto mast structure 302. As shown in FIG. 13, the horizontal distance between two vortex generators 310 may be 160 millimeters while the vertical distance between two vortex generators 310 may be 260 millimeters. While FIG. 13 shows these distances, the horizontal and vertical distances may be different.

FIG. 14 is an example table that describes various different materials that can be used for magnets 303. As shown in FIG. 14, for each listed material, the key advantages of that material are shown. Also, for each listed material, the advantages of using such material in the bladeless wind turbine system are also shown. FIG. 15 is an example table that describes various different materials that be used for the coils within magnetic induction system 304. As shown in FIG. 15, for each listed material, the key advantages of that material are shown. Also, for each listed material, the advantages of using such material in the bladeless wind turbine system are also shown.

FIG. 16 is an example table that describes various different materials that be used for mast structure 302. As shown in FIG. 16, for each listed material, the key advantages of that material are shown. Also, for each listed material, the advantages of using such material in the bladeless wind turbine system are also shown.

FIG. 17 is an example table that describes various different materials that can be used for a battery associated with bladeless wind turbine system 300. As shown in FIG. 17, for each listed material, the key advantages of that material are shown. Also, for each listed material, the advantages of using such material in the bladeless wind turbine system are also shown.

FIG. 18 is an example table that describes various different materials that can be used for an energy storage system associated with bladeless wind turbine system 300. As shown in FIG. 18, for each listed material, the key advantages of that material are shown. Also, for each listed material, the advantages of using such material in the bladeless wind turbine system are also shown.

Figure 19:
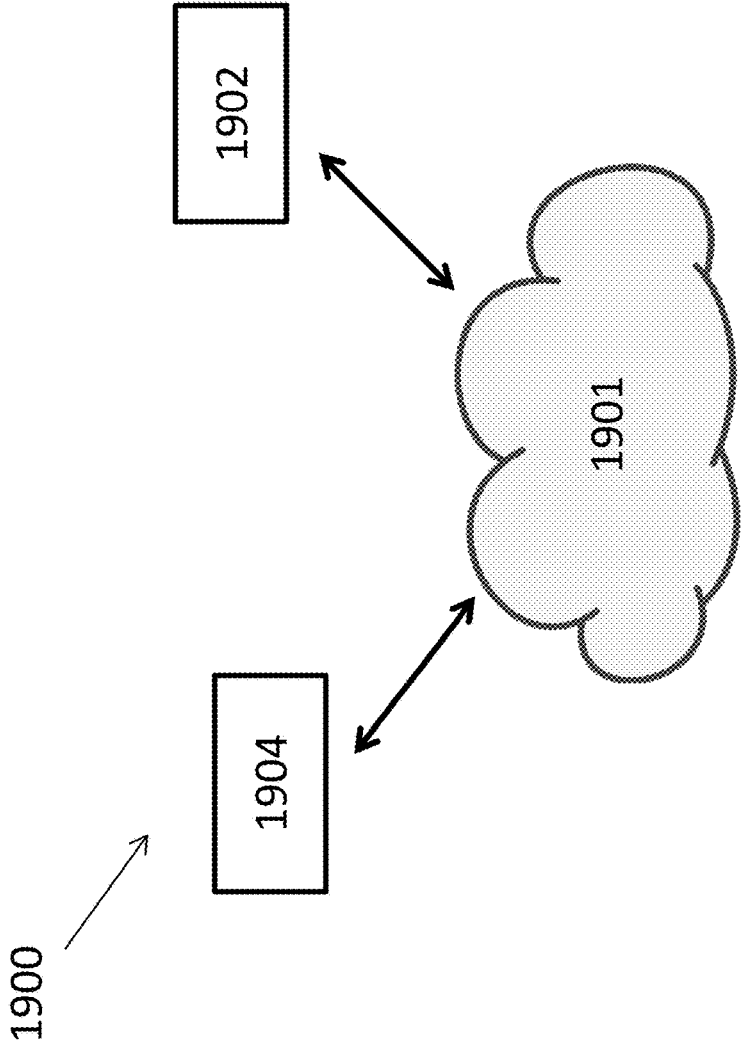
FIG. 19 is a diagram of a network environment.

FIG. 19 is a diagram of example environment 1900 in which systems, devices, and/or methods described herein may be implemented. FIG. 19 shows network 1901, device 1902, and device 1904. Network 1901 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks.

Additionally, or alternatively, network 1901 may include a cellular network, a public land mobile network (PLMN), a second generation (2G) network, a third generation (3G) network, a fourth generation (4G) network, a fifth generation (5G) network, and/or another network. In embodiments, network 1901 may allow for devices describe in any of the figures to electronically communicate (e.g., using emails, electronic signals, URL links, web links, electronic bits, fiber optic signals, wireless signals, wired signals, etc.) with each other so as to send and receive various types of electronic communications. In embodiments, network 1901 may include a cloud network system that incorporates one or more cloud computing systems.

Device 1902 may include any computation or communications device that is capable of communicating with a network (e.g., network 1901). For example, device 1902 may include a wireless communication device, a satellite communication device, and/or any other type of communication system that can receive noise information, convert the noise information into electronic information and send the electronic information to other computing systems/devices such as device 1904. In embodiments, device 1902 may be a sensor that may be attached bladeless wind turbine system 300 (e.g., at the base structure) and can send electronic information (wirelessly) to another device. Device 1904 may include any computation or communications device that is capable of communicating with a network (e.g., network 1901). For example, device 1904 may include a wireless communication device, a satellite communication device, and/or any other type of communication system that can receive wind information, oscillation information, and power information. In embodiments, device 1904 may have a display screen that can display graphical information (e.g., such as described in FIG. 1) that is generated from sensors attached to bladeless wind turbine system 300.

Figure 20:
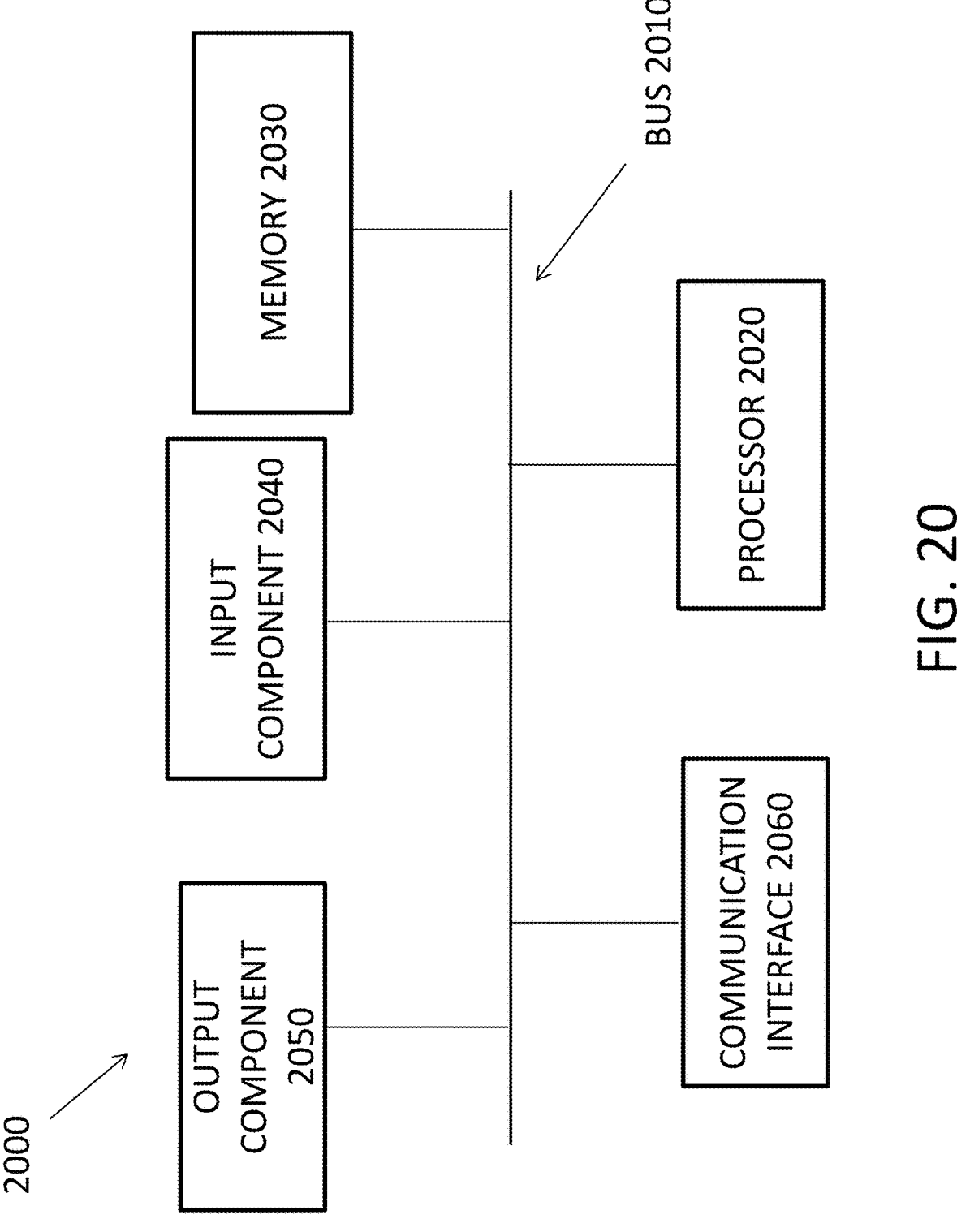
FIG. 20 is a diagram of an example computing device.

FIG. 20 is a diagram of example components of a device 2000. Device 2000 may correspond to network 1901, device 1902, and/or system 1904. Alternatively, or additionally, network 1901, device 1902, system 1904, and/or power system 2100 may include one or more devices 2000 and/or one or more components of device 2000.

As shown in FIG. 20, device 2000 may include a bus 2010, a processor 2020, a memory 2030, an input component 2040, an output component 2050, and a communications interface 2060. In other implementations, device 2000 may contain fewer components, additional components, different components, or differently arranged components than depicted in FIG. 20. Additionally, or alternatively, one or more components of device 2000 may perform one or more tasks described as being performed by one or more other components of device 2000.

Bus 2010 may include a path that permits communications among the components of device 2000. Processor 2020 may include one or more processors, microprocessors, or processing logic (e.g., a field programmable gate array (FPGA) or an application specific integrated circuit (ASIC)) that interprets and executes instructions. Memory 2030 may include any type of dynamic storage device that stores information and instructions, for execution by processor 2020, and/or any type of non-volatile storage device that stores information for use by processor 2020. Input component 2040 may include a mechanism that permits a user to input information to device 2000, such as a keyboard, a keypad, a button, a switch, voice command, etc. Output component 2050 may include a mechanism that outputs information to the user, such as a display, a speaker, one or more light emitting diodes (LEDs), etc.

Communications interface 2060 may include any transceiver-like mechanism that enables device 2000 to communicate with other devices and/or systems. For example, communications interface 2060 may include an Ethernet interface, an optical interface, a coaxial interface, a wireless interface, or the like. In another implementation, communications interface 2060 may include, for example, a transmitter that may convert baseband signals from processor 2020 to radio frequency (RF) signals and/or a receiver that may convert RF signals to baseband signals. Alternatively, communications interface 2060 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 2060 may connect to an antenna assembly (not shown in FIG. 20) for transmission and/or reception of the RF signals. The antenna assembly may include one or more antennas to transmit and/or receive RF signals over the air. The antenna assembly may, for example, receive RF signals from communications interface 2060 and transmit the RF signals over the air, and receive RF signals over the air and provide the RF signals to communications interface 360. In one implementation, for example, communications interface 2060 may communicate with network 1901.

As will be described in detail below, device 2000 may perform certain operations. Device 2000 may perform these operations in response to processor 2020 executing software instructions (e.g., computer program(s)) contained in a computer-readable medium, such as memory 330, a secondary storage device (e.g., hard disk.), or other forms of RAM or ROM. A computer-readable medium may be defined as a non-transitory memory device. A memory device may include space within a single physical memory device or spread across multiple physical memory devices. The software instructions may be read into memory 2030 from another computer-readable medium or from another device. The software instructions contained in memory 2030 may cause processor 2020 to perform processes described herein. Alternatively, hardwired circuitry may be used in place of or in combination with software instructions to implement processes described herein. Thus, implementations described herein are not limited to any specific combination of hardware circuitry and software.

Figure 21:
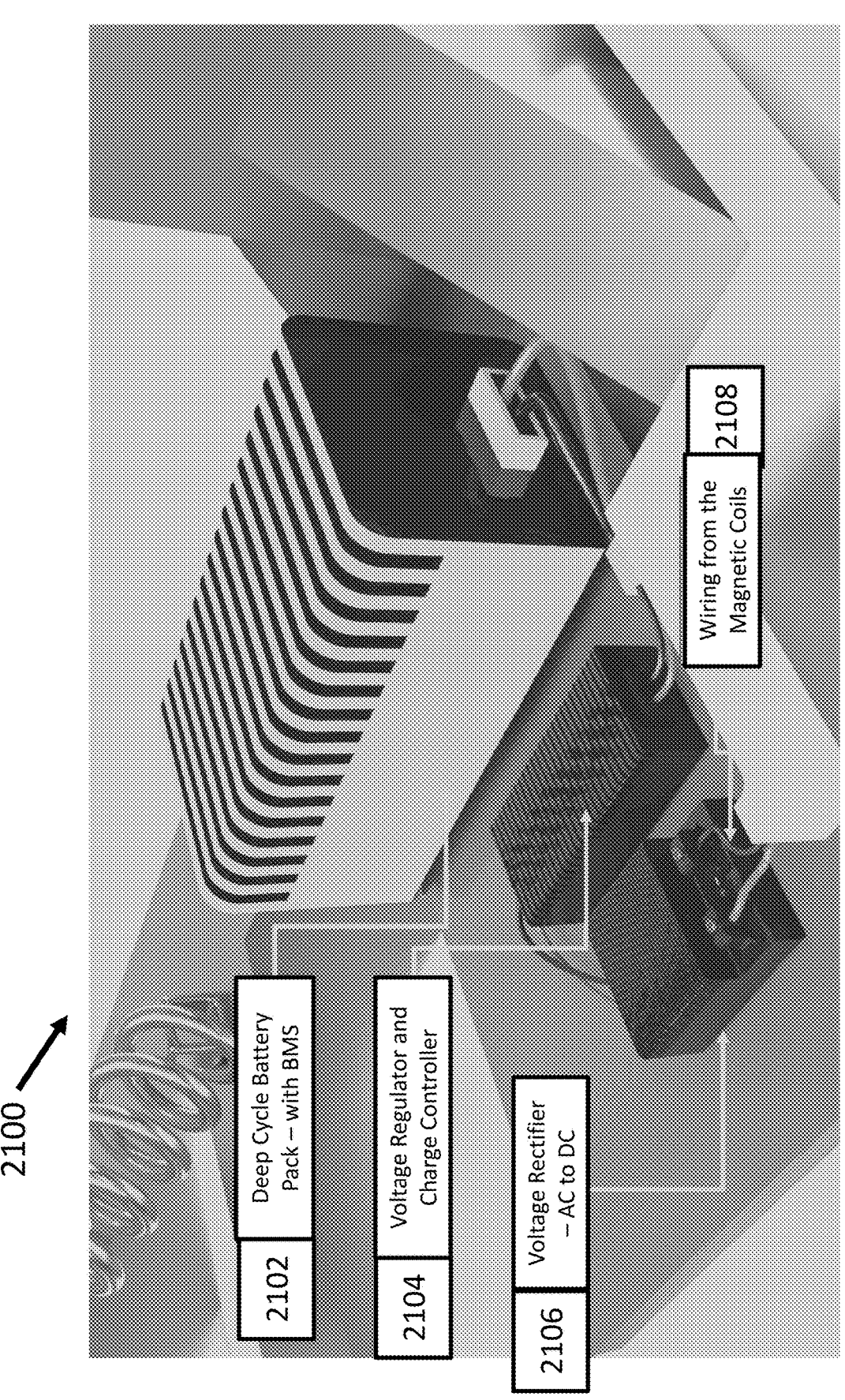
FIGS. 21, 22, 23, and 24 are diagrams describing a battery system.
Figure 22:
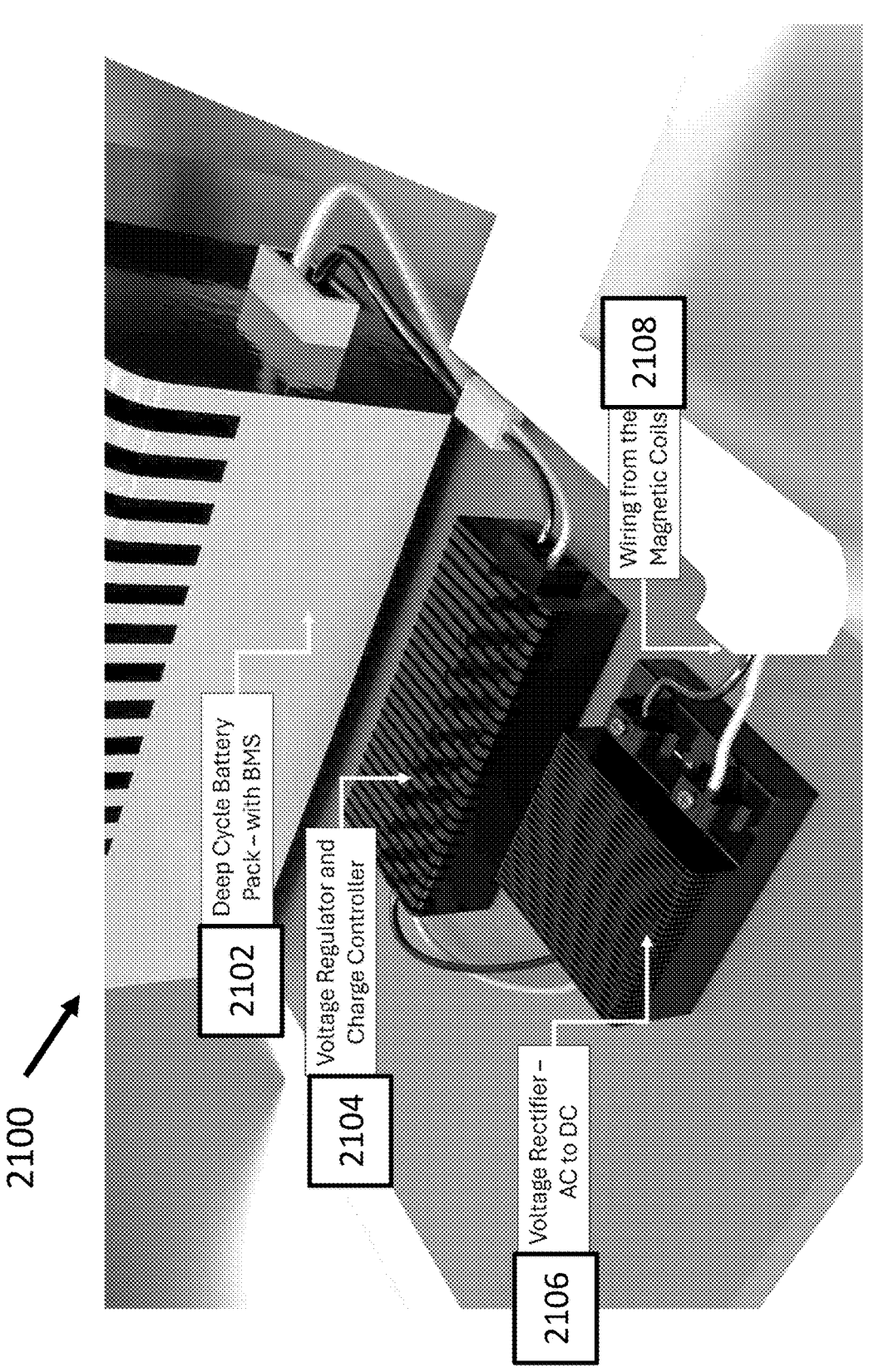
Figure 23:
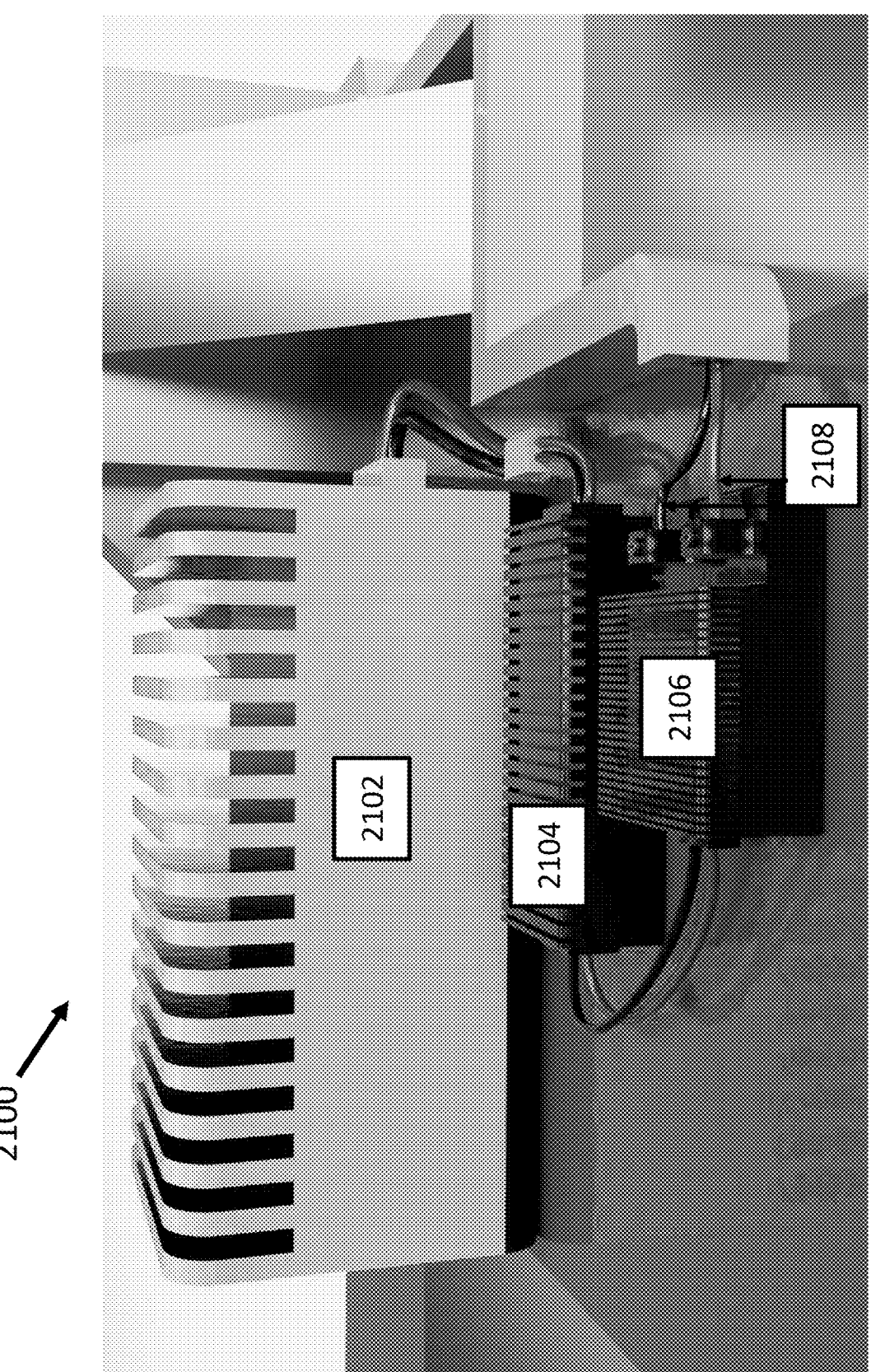
Figure 24:
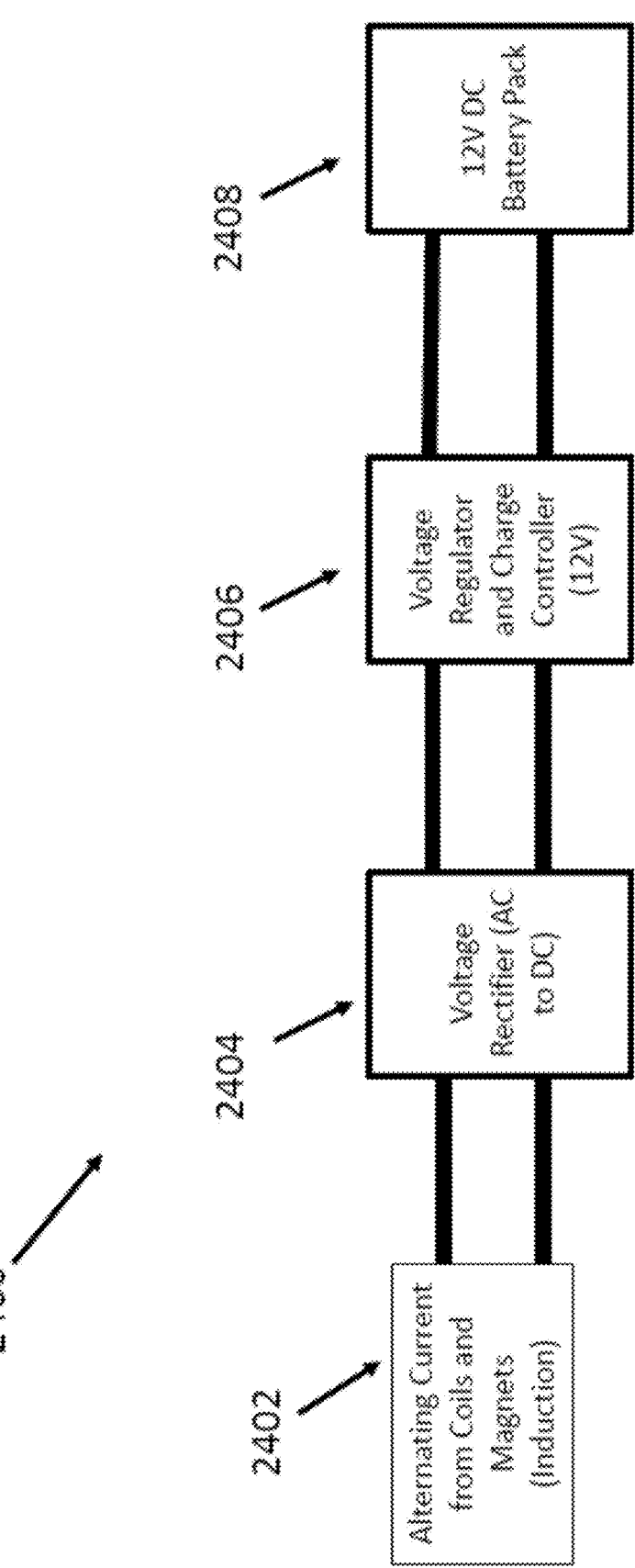

FIG. 21 is an example diagram describing power system 2100. In embodiments, power system 2100 may use the alternating current (AC) generated by bladeless wind turbine system 300 as described in the above figures. As shown in FIG. 21, power system 2100 includes deep cycle power battery pack 2102, voltage regulator and charge controller 2104, voltage rectifier 2106, and wiring 2108. As shown in FIG. 21, the alternating current (AC) from the induction generator (copper windings 304A and magnetic induction system 304) is directed to voltage rectifier 2106, converting the current from AC to DC. In embodiments, the DC current is sent into voltage regulator and charge controller 2104, rated at 12V, to control and regulate the voltage (step up/step down regulation) to a value suitable for the battery pack (12V). The voltage output from the regulator is sent then into deep cycle power battery pack 2102 for charging and later use. In embodiments, power battery pack 2102 may also be a DC to AC unit and can be used here for use with grid devices. FIGS. 22 and 23 show additional perspective views of power system 2100. FIG. 24 shows an example schematic diagram 2400 of power system 2100. As shown in FIG. 24, the schematic diagram describes power system 2100 with 12V for the battery system and also the voltage regulator and charge controller.

In embodiments, a battery management system (BMS) can be used and connected to the battery pack, this would be used as a safety tool, which would stop the charging or discharging the process in case anomalies are detected (e.g., high temperatures, state of charge, battery voltage, etc.) In embodiments, a battery pack with higher or lower voltage can still be used in this configuration, since the voltage regulator can usually be controlled to set different voltage values (i.e. instead of 12V, other voltages an be used such as 7.4V, 24V, etc.)

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 19, to complete such actions.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A bladeless wind turbine apparatus, comprising:
a mast, wherein the mast is configured to oscillate;
protrusions on a surface of the mast;
a base structure, wherein the base structure includes:
a center structure,
a top structure,
a bottom structure, and
multiple legs, wherein the multiple legs are parallel to the center structure;
a first connector, wherein:
the center structure of the base structure is connected to a bottom part of the first connector and the mast is connected to a top part of the first connector;
springs, wherein the springs connect to the base structure, wherein:

a top edge of at least one of the springs is attached to the center structure, a bottom edge of the at least one of the springs is attached to the bottom structure of the base structure at a location between two of the multiple legs, and the at least one of the springs is at an angle less than 90 degrees based on its attached to the bottom structure and the center structure of the base structure;

at least one magnet, wherein the at least one magnet is attached to the first connector; and at least one magnetic coil wiring, wherein:

the at least one coil magnetic wiring is parallel to the least one magnet, and the at least magnetic coil wiring base is attached to the base structure.

2. The bladeless wind turbine apparatus of claim 1, wherein the mast has a top surface and a bottom surface.

3. The bladeless wind turbine apparatus of claim 2, wherein the top surface has a larger circumference than the bottom surface.

4. The bladeless wind turbine apparatus of claim 1, wherein the base structure has appurtenances on each side.

5. The bladeless wind turbine apparatus of claim 1, wherein the protrusions are prism shaped.

6. A method, comprising:

receiving, by a bladeless wind turbine system, wind, wherein:

the bladeless wind turbine system has a mast that oscillates, the bladeless wind turbine system has protrusions that increases oscillations; and generating, by the bladeless wind turbine system, power based on the oscillations, wherein the generating the power is based on:

at least one magnet and at least one magnetic coil wiring, and springs connected to a base structure wherein:

the base structure includes:

a center structure, a top structure, a bottom structure, and multiple legs, wherein the multiple legs are parallel to the center structure; and the bladeless wind turbine system further includes:

a first connector, wherein:

the center structure of the base structure is connected to a bottom part of the first connector and the mast is connected to a top part of the first connector, and the springs are configured to connect to the base structure, wherein:

a top edge of at least one of the springs is attached to the center structure, a bottom edge of the at least one of the springs is attached to the bottom structure of the base structure at a location between two of the multiple legs, and the at least one of the springs is at an angle less than 90 degrees based on its attached to the bottom structure and the center structure of the base structure;

the at least one magnet is attached to the first connector, wherein:

the at least one coil magnetic wiring is parallel to the least one magnet, and the at least magnetic coil wiring base is attached to the base structure.

7. The method of claim 6, wherein the mast has a top surface that has a circumference that is greater than a bottom surface of the mast.

8. The method of claim 6, wherein the protrusions are prism shaped.

9. The bladeless wind turbine apparatus of claim 8, wherein:

a horizontal distance between a first protrusion, of the protrusions, and a second protrusion, of the protrusions, is less than a vertical distance between the first protrusion and a third protrusion of the protrusions.

10. The apparatus of claim 1, wherein the springs cause a vortex shedding frequency to be equivalent to the frequency of the bladeless wind turbine.

11. The apparatus of claim 1, wherein one of the protrusions has its top edge parallel to the surface of the mast and another one of the protrusions has its top edge perpendicular to the surface of the mast.

12. The method of claim 7, wherein the generating the power is based on the springs which are configured to a cause a vortex shedding frequency to be equivalent to the frequency of the bladeless wind turbine.

13. The method of claim 6, wherein one of the protrusions has its top edge parallel to the surface of the mast and another one of the protrusions has its top edge perpendicular to the surface of the mast.

*   *   *   *   *